United States Patent
Kondou et al.

[11] Patent Number: 5,684,708
[45] Date of Patent: Nov. 4, 1997

[54] NUMERICALLY CONTROLLED MACHINING METHOD AND SYSTEM

[75] Inventors: Hitoshi Kondou; Yuji Seki, both of Kawasaki, Japan

[73] Assignee: Fujitsu Limited, Kanagawa, Japan

[21] Appl. No.: 408,144

[22] Filed: Mar. 20, 1995

[30] Foreign Application Priority Data

Jun. 30, 1994 [JP] Japan ................... 6-149109

[51] Int. Cl.⁶ .................... G06F 19/00; G05B 19/418
[52] U.S. Cl. .................... 364/474.15; 364/474.21; 364/468.06
[58] Field of Search ................ 364/474.11, 474.15, 364/474.21, 468.03, 468.05, 468.06, 468.07, 156; 395/207, 208

[56] References Cited

U.S. PATENT DOCUMENTS

| | | | |
|---|---|---|---|
| 4,642,756 | 2/1987 | Sherrod | 364/200 |
| 4,700,313 | 10/1987 | Takagawa | 364/474 |
| 4,807,108 | 2/1989 | Ben-Arieh et al. | 364/148 |
| 4,994,980 | 2/1991 | Lee et al. | 364/474.15 |
| 4,998,196 | 3/1991 | Seki et al. | 364/191 |
| 5,031,105 | 7/1991 | Okuzono et al. | 364/474.01 |
| 5,032,975 | 7/1991 | Yamamoto et al. | 364/134 |
| 5,041,985 | 8/1991 | Fujita | 364/474.21 |
| 5,050,088 | 9/1991 | Buckler et al. | 364/468 |
| 5,184,052 | 2/1993 | Ikeda | 318/569 |
| 5,266,878 | 11/1993 | Makino et al. | 318/571 |
| 5,325,307 | 6/1994 | Akashi | 364/474.11 |
| 5,374,231 | 12/1994 | Obrist | 483/15 |
| 5,378,218 | 1/1995 | Daimaru et al. | 483/9 |
| 5,388,051 | 2/1995 | Seki et al. | 364/474.11 |
| 5,401,229 | 3/1995 | Otsuka et al. | 483/15 |
| 5,446,669 | 8/1995 | Yamashita et al. | 364/468 |
| 5,469,361 | 11/1995 | Moyne | 364/468 |

*Primary Examiner*—Joseph Ruggiero
*Attorney, Agent, or Firm*—Helfgott & Karas, P.C.

[57] ABSTRACT

A numerically controlled machining method and a numerically controlled machining system execute numerically controlled machining. An optimum processing tool is selected based on the numerical control orders, and the processing steps are optimized. A numerically controlled machining system is constituted by a numerically controlled processor, controllers and numerically controlled machines. The numerically controlled processor finds production times for machining parts for all the numerical control orders and compares them with a reference value to classify them into a group of special express processes and a group of normal processes. The special express processes pertain to the group of machining methods giving importance to the degree of finish, and the normal processes are divided into a group of machining methods for minimizing the exchange of machining tools or to a group of machining methods of optimizing a drawing number, whichever gives better machining efficiency. The numerically controlled processor further prepares numerical control machining data for each of the groups and distributes them to the controllers.

16 Claims, 30 Drawing Sheets

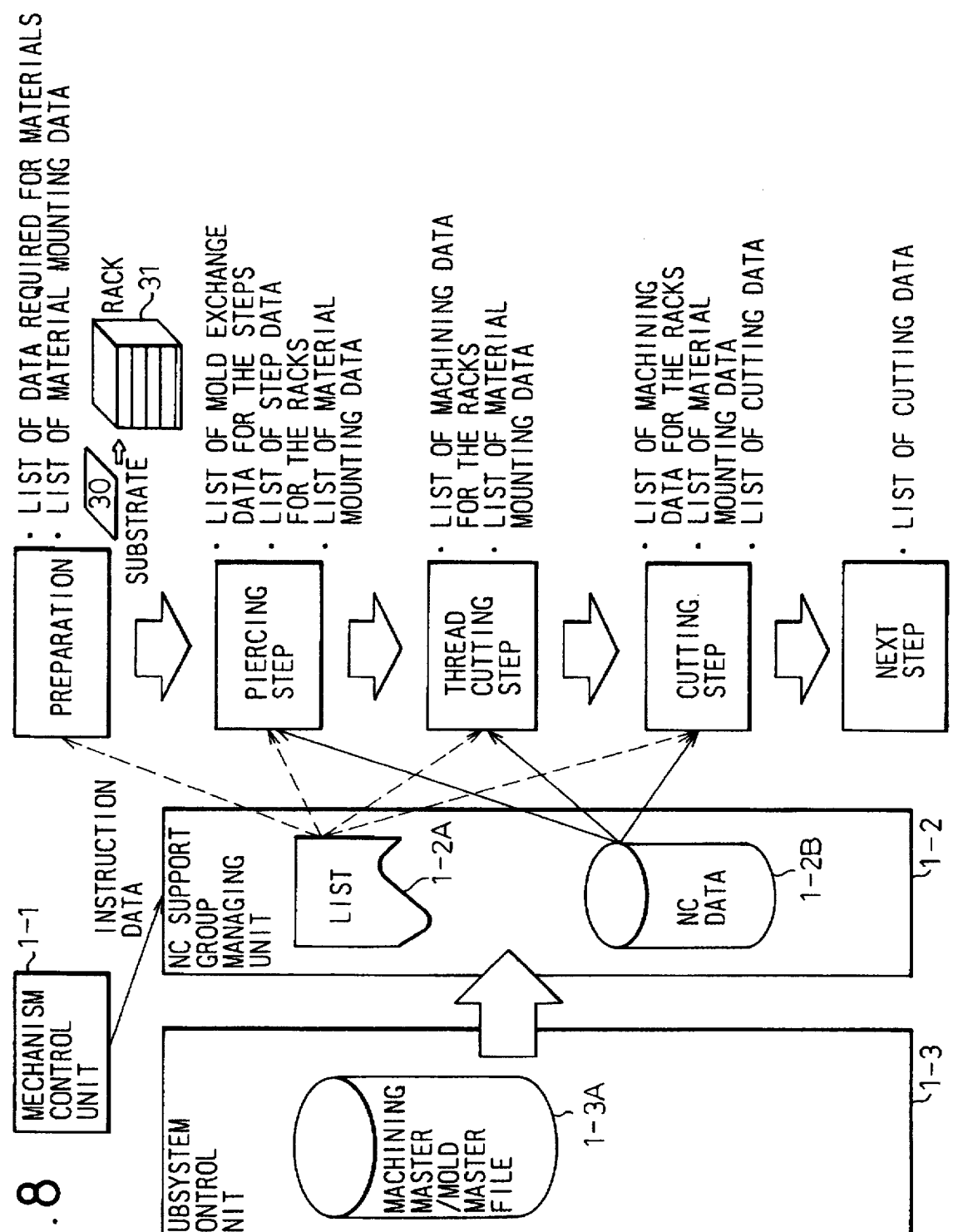

Fig. 10A

| CONDITIONAL EXPRESSION 1 | PRODUCTION TURN = NC DUE TERM OF ORDER – DATE OF STRARTING NC WORK OF ORDER |
|---|---|
| CONDITIONAL EXPRESSION 2 | ARRANGEMENT RATE = ② × ③ × ④ ÷ ① × 100 <br><br> NUMBER OF PIECES OF SUBSTRATES = ORDER INSTRUCTION NUMBER ÷ (③ × ④) <br> [+1, WHEN THERE IS REMAINDER] <br><br> ① EFFECTIVE SIZE X OF SUBSTRATE × EFFECTIVE SIZE Y OF SUBSTRATE <br> ② SIZE X OF DRAWING NUMBER × SIZE Y OF DRAWING NUMBER <br> ③ NUMBER OBTAINED IN THE DIRECTION X = EFFECTIVE SIZE X OF SUBSTRATE ÷ SIZE X OF DRAWING NUMBER <br> ④ NUMBER OBTAINED IN THE DIRECTION Y = EFFECTIVE SIZE Y OF SUBSTRATE ÷ SIZE Y OF DRAWING NUMBER |

Fig. 10B

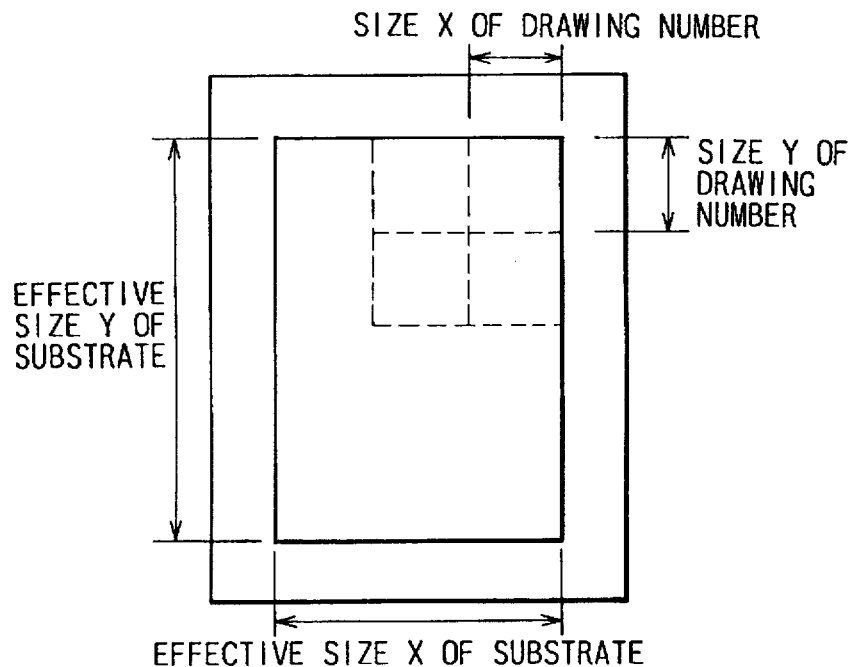

Fig.11

| JUDGEMENT 1 | PRODUCTION TURN < 7 DAYS ⇨ SPECIAL EXPRESS PROCESSING<br>PRODUCTION TURN ≥ 7 DAYS ⇨ NORMAL PROCESSING |
|---|---|
| JUDGEMENT 2 | ① ARRANGEMENT RATE < 60% & NUMBER OF SUBSTRATES > 10 PIECES<br>⇨ NON-STANDARD-LENGTH PROCESSING<br>② ARRANGEMENT RATE ≥ 60% & NUMBER OF SUBSTRATES > 20 PIECES<br>⇨ NON-STANDARD-LENGTH PROCESSING<br>NEITHER ① NOR ② ⇨ STANDARD-LENGTH PROCESSING |
| JUDGEMENT 3 | 0.8mm ≦ THICKNESS < 1.3mm ⇨ THIN GROUP<br>1.3mm ≦ THICKNESS < 1.9mm ⇨ INTERMEDIATE GROUP<br>1.9mm ≦ THICKNESS < 2.4mm ⇨ THICK GROUP |
| JUDGEMENT 4 | SIZE X OF DRAWING NUMBER < 100mm & SIZE Y OF DRAWING<br>NUMBER < 100mm ⇨ INTERMEDIATE-TO-LIGHT PROCESSING<br>SIZE X OF DRAWING NUMBER ≧ 100mm & SIZE Y OF DRAWING<br>NUMBER ≧ 100mm ⇨ HEAVY PROCESSING |

Fig.15A

| CONDITION | FILE NAME | FILE NAME | OUTLINE |
|---|---|---|---|
| 1 | tokyukae.cnd | EXCHANGE OF GRADE | ARRANGEMENT RATE OF UW SEPARATION AND NUMBER OF SUBSTRATES |
| 2 | itaatugp.cnd | THICK GROUP | RANGE OF THICK GROUP |
| 3 | ppbunkat.cnd | PP PRODUCT DIVISION | OUTER SHAPE,SIZES X,Y OF PP PRODUCTS |
| 4 | panchkes.cnd | PUNCH COEFFICIENT | UNIT FOR CALCULATING MACHINING TIME |
| 5 | goukiset.cnd | MACHINE SETTING | MACHINE NO.DEPENDING ON ORDER-CLASSIFYING FILES |
| 6 | zanzailn.cnd | RANK OF REMAINING MATERIALS | RANK DEPENDING ON SIZE OF REMAINING MATERIALS |
| 7 | haicritu.cnd | ARRANGEMENT RATE | ARRANGEMENT RATE FOR JUDGING CHANGE OF SUBSTRATE |
| 8 | karikote.cnd | TENTATIVE FIXED MOLD SETTING | DIE OF TENTATIVE FIXED MOLD AND NUMBER OF MOLDS |
| 9 | kanskibn.cnd | NUMBER OF FINISHED SUBSTRATES | MIN.NUMBER OF FINISHED SUBSTRATES IN A STEP |
| 10 | koknsegn.cnd | EXCHANGE LIMIT | LIMIT NUMBER OF EXCHANGING THE SAME MOLD |

Fig.15B

|    |              |                               |                                                      |
|----|--------------|-------------------------------|------------------------------------------------------|
| 11 | cyoseido.cnd | STEP ADJUST MOTION            | SIZE OF ROUND HOLE OF WHEN STEP IS ADJUSTED          |
| 12 | ynsenset.cnd | MOLD PREFERENCE SET           | PREFERENTIAL SHAPE OF WHEN MOLD IS SET               |
| 13 | tosaimai.cnd | RACK-MOUNTED NUMBER           | MAX. NUMBER MOUNTED ON A RACK                        |
| 14 | touitsua.mst | UNIFORMALIZED HOLE DIAMETER   | RANGE OF UNIFORMALIZED HOLE SIZES                    |
| 15 | saisyoua.mst | MIN. HOLE DIAMETER            | MIN. HOLE DIAMETER DEPENDING ON THICKNESS            |
| 16 | tstation.cnd | TAP STN. DATA                 | TAP STATION DATA                                     |
| 17 | keijonuk.cnd | PIERCING ORDER DEPENDING ON SHAPE | PIERCING ORDER DEPENDING ON SHAPE                |
| 18 | oinukijk.cnd | FOLLOW-PIERCING               | FOLLOW-PIERCING CONDITIONS                           |
| 19 | ncstscod.cnd | NC STATE CODE                 | NC STATE CODE                                        |
| 20 | kakoushu.cnd | TYPE OF MACHINING             | TYPE OF MACHINING CODE                               |

Fig.15C

| | | | *3 |
|---|---|---|---|
| 21 | kakokigp.cnd | MACHINE GROUP | MACHINE GROUP |
| 22 | ncstrstp.cnd | NC START/RETURN | START DEPENDING ON MACHINE/RETURN DATA |
| 23 | stopcomd.cnd | TEMPORARY STOP COMMAND | TEMPORARY STOP COMMAND |
| 24<br>25<br>26<br>27<br>28 | movecomd.cnd<br>kiriwake.cnd<br>suteanaf.cnd<br>stdnhose.cnd<br>notaocmd.cnd | MOVING COMMAND<br>PRODUCT/SCRAP<br>USELESS HOLE MOLD<br>CUT CORRECTION<br>NO TAP COMMAND | MOVING COMMAND<br>PRODUCT/SCRAP COMMAND<br>DATA OF MOLD FOR USELESS HOLES<br>SIZE OF CUT CORRECTION<br>NO TAP COMMAND |
| 29 | pstation.mst | PIERCING STN.DATA AND | STATION DATA DEPENDING ON MACHINE SET PATTERN |
| 30 | hyojcycl.cnd | DISPLAY CYCLE | CYCLE TIME FOR DISPLAYING NC OPERATION CONDITION |
| 31 | KIKO.ZAIRYO | MATERIAL CODE | CODES FOR IDENTIFYING MATERIALS, THICKNESSES |
| 32 | KIKO.KATA | MOLD DATA | MOLD NO., SHAPE, SIZE, ETC. |
| --- | | | |

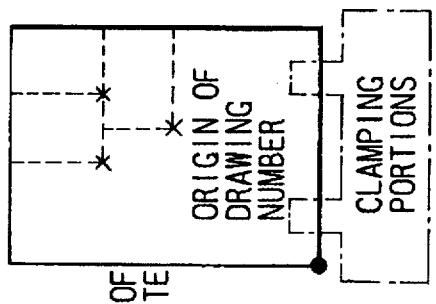
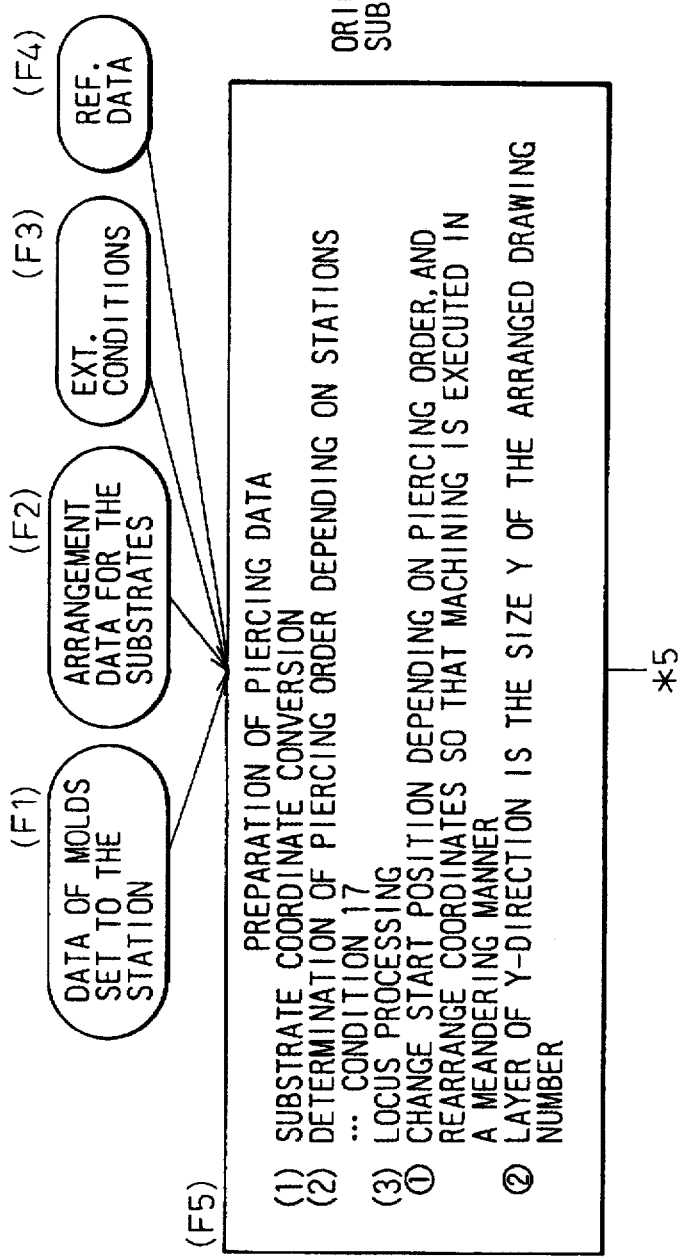

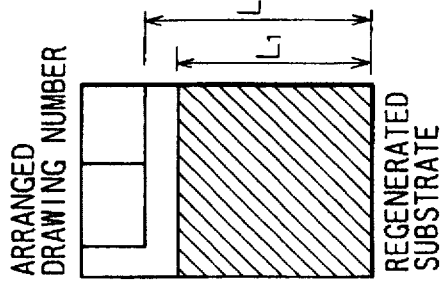

Fig. 20E

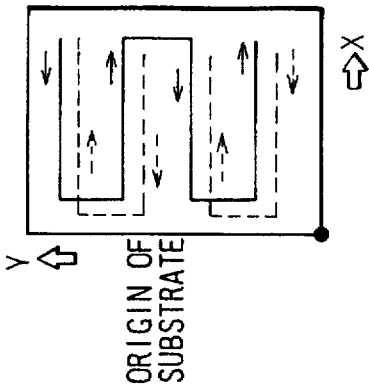

(1) PREPARATION OF TAPPING DATA
① CLASSIFICATION DEPENDING ON MATERIALS ... CONDITION 16
   CLASSIFY INTO GROUPS DEPENDING ON MATERIALS
② SET STATION, DESCENDING SPEED AND REVOLVING SPEED OF DRILL DEPENDING ON MATERIALS (2) PICK UP DATA OF TAPPED HOLES
① PICK UP DATA OF HOLES TO BE TAPPED, CONVERT THEM INTO COORDINATES FROM THE ORIGIN OF SUBSTRATE
② CUT COMMANDS THAT ARE NOT RELATED TO TAPPING ... CONDITION 28
③ DECOMPOSE COMMAND COORDINATES (3) LOCUS PROCESSING
① CHANGE START POSITION DEPENDING ON TAPPING ORDER, AND REARRANGE COORDINATES SO THAT MACHINING IS EXECUTED IN A MEANDERING MANNER
② THE LAYER IN THE Y-DIRECTION IS THE Y-SIZE OF A DRAWING NUMBER THAT IS ARRANGED (F7)

PREPARATION OF CUTTING DATA
(1) PICK UP CUTTING POINT
① DETERMINE RANK OF REMAINING MATERIAL ... CONDITION 6
② CALCULATE REMAINING SIZE Y OF THE REMAINING MATERIAL
③ DETERMINE RANK OF REMAINING MATERIAL DEPENDING ON REMAINING Y-SIZE (3) SUBSTRATE REGENERATION PROCESSING
① WHEN THE REMAINING SIZE Y IS LARGER THAN A SPECIFIED VALUE, COORDINATES ARE GENERATED FOR CUTTING WITH A SPECIFIED VALUE TO PREPARE A SUBSTRATE SMALLER THAN A PRESENT SIZE OF SUBSTRATE (F8) NC DATA

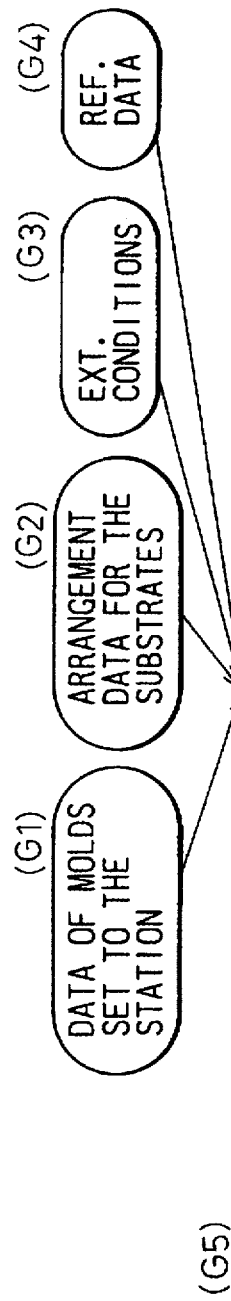
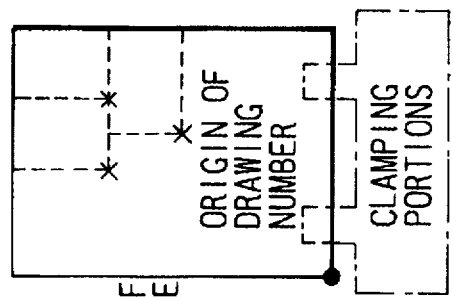

Fig.21B
*6

(G6) ADJUSTMENT OF MACHINING TIME AMONG STEPS

(1) UNIFORMALIZE MACHINING TIME OF RACK
  ① CALCULATE MACHINING TIME DEPENDING ON RACKS OF WHEN FIXED MOLDS(SMALL-DIAMETER ROUND HOLES), TENTATIVE FIXED MOLDS AND PREFERENTIAL PIERCING MOLDS ARE PREFERENTIALLY SET.
  ② MOVE MACHINING WITH FIXED MOLDS FROM A RACK WHERE MACHINING TIME DOES NOT CONTINUE FOR EVERY EXCHANGE OF MOLDS INTO A PLACE WHERE THE MACHINING TIME IS SHORT, IN ORDER TO UNIFORMALIZE THE MACHINING TIME ... CONDITION 11

(G7) PREPARATION OF TAPPING DATA

(1) ① CLASSIFICATION DEPENDING ON MATERIALS ... CONDITION 16
   ② CLASSIFY INTO GROUPS DEPENDING ON MATERIALS
   ③ SET STATION, DESCENDING SPEED AND REVOLVING SPEED OF DRILL DEPENDING ON MATERIALS
(2) ① PICK UP DATA OF TAPPED HOLES
   ② PICK UP DATA OF HOLES TO BE TAPPED, CONVERT THEM INTO COORDINATES FROM THE ORIGIN OF SUBSTRATE
   ② CUT COMMANDS THAT ARE NOT RELATED TO TAPPING ... CONDITION 28
   ③ DECOMPOSE COMMAND COORDINATES
(3) LOCUS PROCESSING
   ① CHANGE START POSITION DEPENDING ON TAPPING ORDER, AND REARRANGE COORDINATES SO THAT MACHINING IS EXECUTED IN A MEANDERING MANNER
(2) THE LAYER IN THE Y-DIRECTION IS THE Y-SIZE OF A DRAWING NUMBER THAT IS ARRANGED

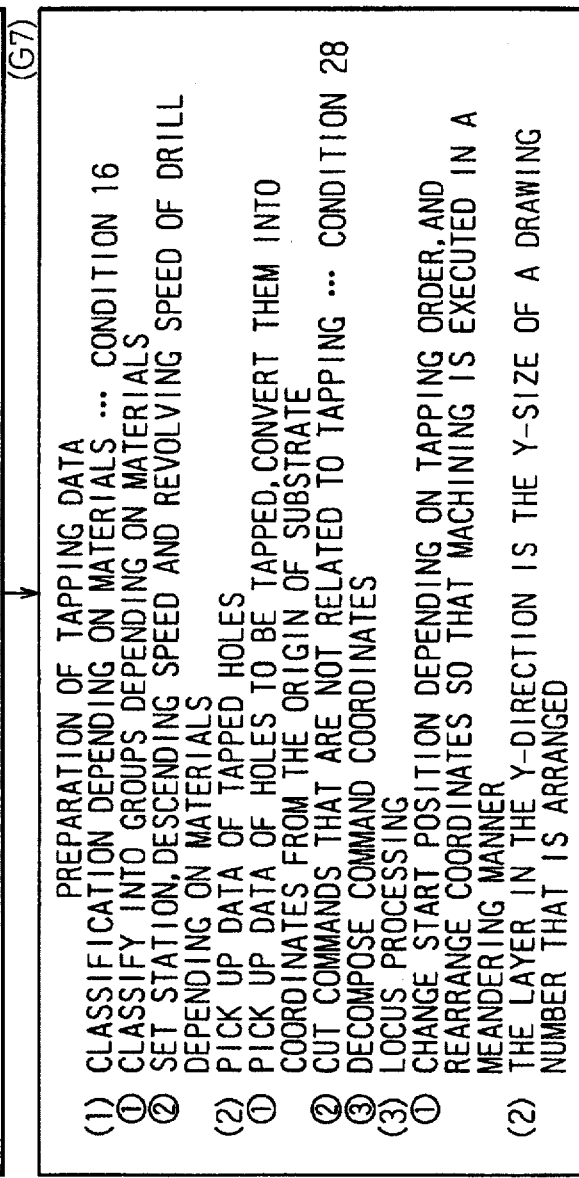

ORIGIN OF SUBSTRATE

Fig.22A

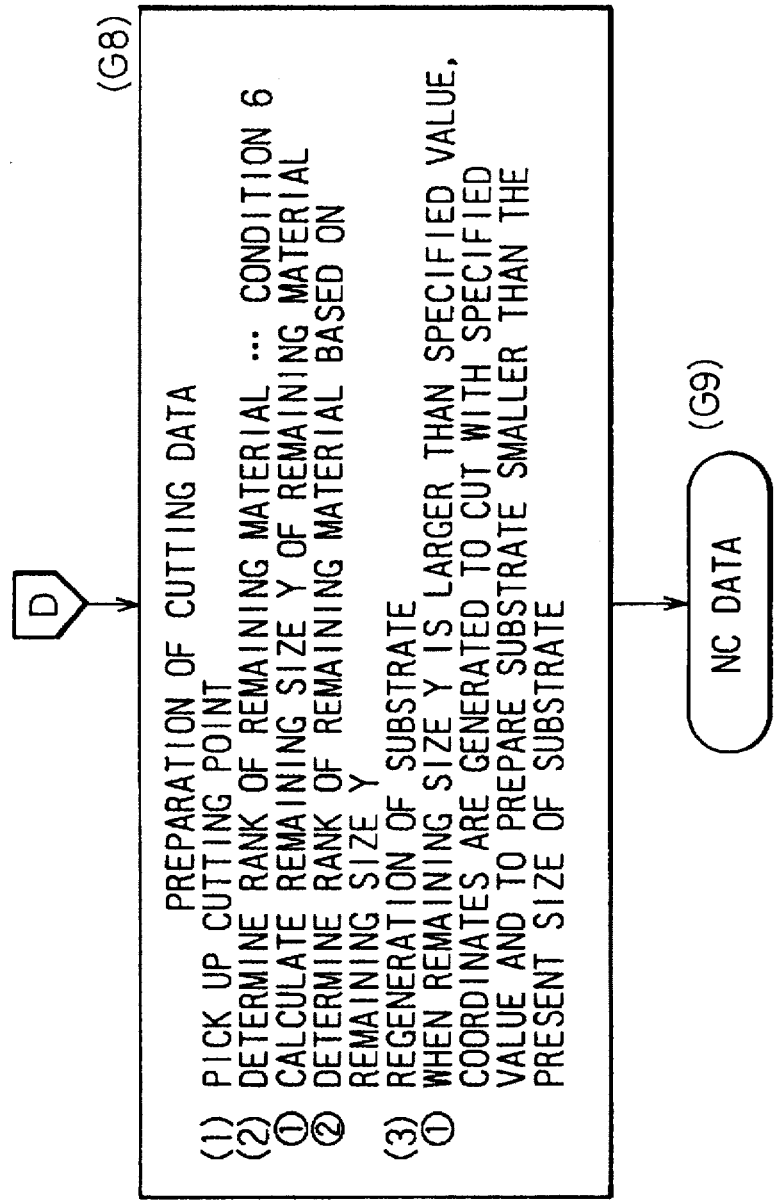

PREPARATION OF CUTTING DATA
(1) PICK UP CUTTING POINT
(2) ① DETERMINE RANK OF REMAINING MATERIAL ... CONDITION 6
② CALCULATE REMAINING SIZE Y OF REMAINING MATERIAL
③ DETERMINE RANK OF REMAINING MATERIAL BASED ON REMAINING SIZE Y
(3) ① REGENERATION OF SUBSTRATE
② WHEN REMAINING SIZE Y IS LARGER THAN SPECIFIED VALUE, COORDINATES ARE GENERATED TO CUT WITH SPECIFIED VALUE AND TO PREPARE SUBSTRATE SMALLER THAN THE PRESENT SIZE OF SUBSTRATE (G8)

→ NC DATA (G9)

Fig.22B

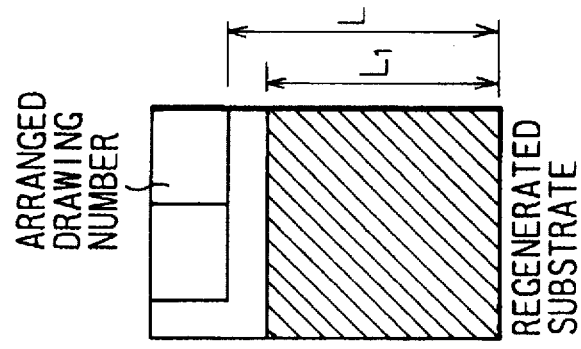

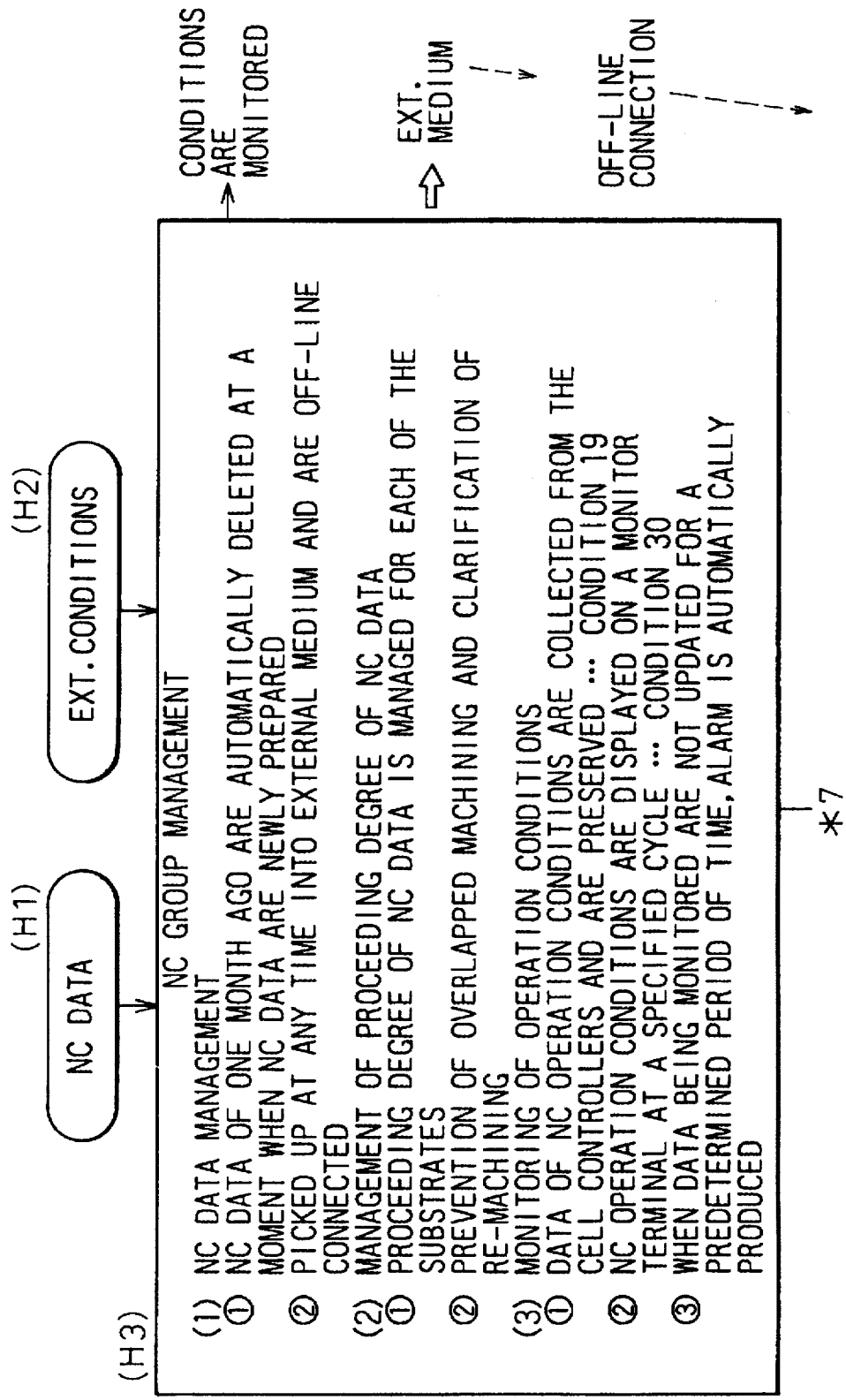

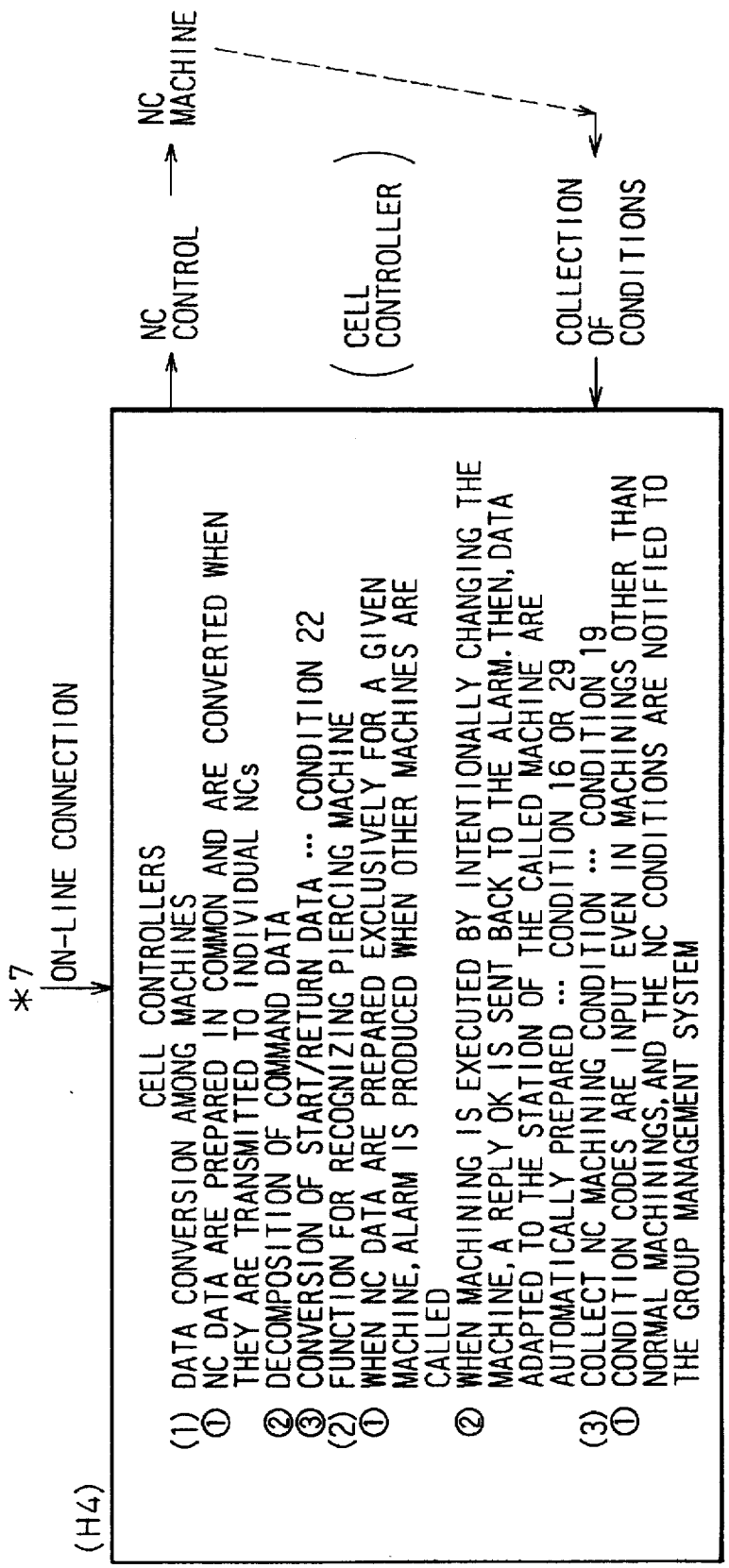

NUMERICALLY CONTROLLED MACHINING METHOD AND SYSTEM

BACKGROUND OF THE INVENTION

1. Field of the Invention

The present invention relates to a numerically controlled machining method, and to a numerically controlled machining system, for providing a numerically controlled machining.

There has been known a numerically controlled machining system in which a variety of machines are arranged according to the machining steps and numerical control data are passed to the corresponding machines to execute a variety of machining processes to produce a variety of parts. When a variety of kinds of products are to be produced in small quantities by using such a numerically controlled machining system, it has been desired to improve the machining efficiency.

2. Description of the Related Art

A variety of housings and substrates for mounting various parts have been produced by a numerically controlled machining system in which a piercing machine for forming holes of predetermined sizes at predetermined positions, a thread cutting machine for cutting thread in the holes for fastening with screws, and a cutting machine for cutting the material into predetermined sizes, are sequentially arranged and are controlled according to numerical control data for machining. The numerically controlled machining system may further include a bending machine for bending the substrate at a predetermined angle and a spot welding machine for spot-welding the substrates.

The piercing machine is equipped with punching molds or tools corresponding to the shapes and sizes of holes of round, square and rectangular, etc. shapes that are to be formed in the substrate, a punching mold being selectively used depending upon the numerical control machining data. Usually, for example, about fifty kinds of punching or piercing molds or tools are mounted in the piercing machine. As the kinds of holes increase, however, it becomes necessary to carry out the piercing step by exchanging the piercing molds. By effecting multiple piercing using the same piercing mold, furthermore, holes of large sizes having various shapes can be formed.

The thread cutting machine is equipped with a plurality of kinds of taps which are selectively used depending upon the size of the tapped hole. The cutting machine is generally constituted so as to simultaneously cut two sides and cuts the substrate into a desired size after a plurality of holes have been pierced in a larger substrate and after the tapping has been executed.

By employing the above-mentioned numerically controlled machining system for machining substrates, a variety of kinds of products can be produced in small quantities by any one of (1) a machining method giving importance to the degree of finish (hereinafter referred to as "NC support 1"), (2) a machining method for minimizing the exchange of piercing or punching molds (hereinafter referred to as "NC support 2"), and (3) a machining method for optimizing a drawing number (hereinafter referred to as "NC support 0").

According to the NC support 1 of (1) above, a plurality of drawing numbers are grouped to select the molds and to execute the arrangement (nesting), in order to finish the machining for the substrate through one time of mold exchange. This method features a quick finish for each substrate and is, hence, adapted to a special express machining.

According to the NC support 2 of (2), punching molds or tools which are very frequently used are selected out of all drawing numbers, and when the drawing numbers for machining with the corresponding punching molds are selected, the drawing numbers only with which the machining will be finished are arranged and, then, the molds are set starting from the unfinished drawing numbers having decreased number of remaining molds or tools, and the machining is repeated. In this case, the number of molds used can be decreased since the same molds are set only one time.

According to the NC support 0 of (3), the molds are exchanged and the arrangement processing is optimized for each of the drawing numbers. Therefore, the number of molds or tools and the rate of arrangement for the substrate are optimized.

In the conventional numerically controlled machining systems, the above-mentioned NC supports 0, 1 and 2 are selected by a worker based upon the due terms, the number of instructions and on his experience and skill and are not, in many cases, optimized. Moreover, the numerical control machining data are prepared for specific machines. If a specific machine becomes defective and the machining must be done by using other machines, the numerical control machining data must be prepared again.

According to the above-mentioned conventional NC support 0, furthermore, the machining is executed using one drawing number and arranging a number of molds or tools. Therefore, selection of molds or tools and the arrangement of the drawing number can be optimized in making a substrate. However, between the substrates (the boundary where the drawing number changes), the data for exchanging molds or tools and the materials are grouped relying upon the experience and skill of the worker, making it difficult to use the molds or tools in common and impairing the efficiency of exchanging the molds.

According to the above-mentioned conventional NC support 1, the mold or tool that is required is set each time neglecting the preceding data related to exchanging the molds. Therefore, molds or tools that are once removed may often be set in the system again, causing the molds to be exchanged an increased number of times and impairing the working efficiency.

According to the above-mentioned conventional NC support 2, a mold or tool which is used very frequently, for example, a round mold or punching tool which is used relatively frequently is set at the first time of exchanging the molds, and the machining is executed in a concentrated manner. In this case, the machining time increases in the first step but decreases to an extreme degree in subsequent steps. In the case of a rack for which no step is executed after the machining of the first step, the incomplete period (the period in which the product remains unfinished) increases. When this period becomes too long, the product rusts and the quality deteriorates.

SUMMARY OF THE INVENTION

It is an object of the present invention to select an optimum processing and to optimize processing steps based upon numerical control orders.

In accordance with the present invention, there is provided a numerically controlled machining method comprising the steps of finding turns or working times for all of the numerical control orders that are input, comparing said times with a reference value which is a standard working time to classify the numerical control orders of which the necessary times are smaller than the reference value to be a group of special express processings and to classify the numerical control orders of which the working times are larger than the reference value to be a group of normal processings, classifying the processings into any one of machining methods giving importance to the degree of finish for shortening the finishing period, machining methods of minimizing the number of times of exchanging the molds, or machining methods for optimizing a drawing number by bringing the arrangement processing into consideration whichever gives a higher machining efficiency based upon the machining data, and preparing numerical control machining data for each of the groups.

The numerically controlled machining method further comprises the steps of finding turns or necessary working times for all of the numerical control orders that are input, comparing said turns or times with a reference value to classify the numerical control orders of which the turns or times are smaller than the reference value to be a group of special express processes and to classify other numerical control orders to be a group of normal processes, regarding said group of special express processes to be a group of machining methods giving importance to the degree of finish, classifying said group of normal processes to be either one of a group of machining methods for minimizing the number of times of exchanging the molds or tools or a group of machining methods of optimizing a drawing number based upon the machining data of the group, and preparing numerical control machining data for each of the groups.

The numerically controlled machining method, giving importance to the degree of finish, includes the steps of employing a uniform mold or tool made within the range of allowable sizes based upon the machining data, selecting a mold or tool that meets follow-piercing conditions out of the selected molds, and preparing numerical control machining data for selecting a new mold or tool only when there is no mold that meets said follow-piercing conditions.

The numerically controlled machining method, giving importance to the degree of finish, further includes the steps of picking up a mold or tool that is very frequently used as a fixed mold based upon the machining data, exchanging the molds in the order of a mold that will not be used in the subsequent machining, a mold which is used for the machining but has a decreased number of drawing to be used, and a mold that is frequently removed, and preparing numerical control machining data for regarding the mold, whose number of times of exchange exceeds an allowable value, as a fixed mold.

The numerically controlled machining method, giving importance to the degree of finish, may include a step of preparing numerical control machining data based upon the machining data, for executing the arrangement processing in the order of decreasing outer sizes of the drawings that are to be arranged in a manner that the rate of arrangement is larger than a reference value.

The numerically controlled machining method in order to minimize the number of times of exchanging the molds or tools includes the steps of employing a uniform mold within the range of allowable sizes based upon the machining data, selecting a mold that meets follow-piercing conditions out of the selected molds, and preparing numerical control machining data for selecting a new mold only when there is no mold that meets said follow-piercing conditions.

The numerically controlled machining method, in order to minimize the number of times of exchanging the molds, includes the steps of executing the machining in a first step using a fixed mold inclusive of a mold that is very frequently used based upon the machining data and when an empty step occurs after the first step, moving part of the machining in said first step to the head of the next consecutive step, and executing the machining in said first step using the fixed mold and another mold and, when an empty step occurs after said first step, moving part of the machining in said first step to a step having the least machining time after said first step but before a final step, and preparing numerical control machining data.

In the numerically controlled machining method for optimizing a drawing number, the method includes the steps of finding the frequencies for using the molds based upon the machining data, rearranging the molds such that the drawing numbers that use molds that are very frequently used are preferentially machined, and preparing numerical control machining data.

With reference to FIG. 1, the numerically controlled machining system comprises numerically controlled machines 102 arranged in accordance with the machining steps; controllers 101 for controlling said numerically controlled machines; and a numerically controlled processor 100 which finds turns or working times for all of the numerical control orders that are input, compares said turns with a reference value to classify the numerical control orders of which the turns are smaller than the reference value to be a group of special express processes and to classify the numerical control orders of which the turns are larger than the reference value to be a group of normal processes, classifies the processes to be a machining method giving importance to the degree of finish for shortening the finishing period, a machining method for minimizing the number of times of exchanging the molds, or a machining method for optimizing a drawing number, by bringing the arrangement processing into consideration, whichever gives a higher machining efficiency based upon the machining data, prepares numerical control machining data for each of the groups, and distributes said numerical control machining data to controllers 101.

Furthermore, in the numerically controlled machining system, numerically controlled processor 100 includes a mechanism managing unit for managing the numerical control orders that are input, the degree of machining that is done and the load condition of the numerically controlled machines, an NC support group managing unit for distributing to the controller the numerical control machining data by dividing the numerical control machining data into a group of special express processings giving importance to the degree of finish, into a group of machining methods of normal processes for minimizing the number of times of exchanging the molds or tools, and into a group of machining methods for optimizing a drawing number, and a subsystem control unit for managing the mold master data and machining master data.

BRIEF DESCRIPTION OF THE DRAWINGS

In the drawings:

FIG. 8 is a diagram which illustrates the NC support 2;

FIG. 10A is a diagram illustrating conditional expressions according to the embodiment of the present invention;

FIG. 10B shows a substrate size;

FIG. 11 is a diagram illustrating judging conditions according to the embodiment of the present invention;

FIGS. 15A to 15C are diagrams illustrating conditional data according to the embodiment of the present invention;

FIGS. 20A to 20E are flow charts of NC data preparation 1 according to the embodiment of the present invention;

FIGS. 21A to 21D are flow charts of NC data preparation 2 according to the embodiment of the present invention;

FIGS. 22A and 22B are flow charts of NC data preparation 2 according to the embodiment of the present invention; and FIGS. 23A and 23B are flow charts of NC group management and cell controllers according to the embodiment of the present invention.

DESCRIPTION OF THE PREFERRED EMBODIMENTS

The operation of the present invention will be explained in detail with reference to the drawings below.

A production turn defined as the difference between the due term part (delivery day) and the first one of the days spent for the machining, is found for all of the numerical control orders that are input in the numerically controlled machine. When the turn is smaller than a reference value of, for example, 7 days, the work must be done within 7 days. Therefore, the numerical control orders are classified as a group of special express processes. Other numerical control orders are classified to be of a group of normal processes. Based upon the machining data, furthermore, the processes are classified into a group of machining methods which give importance to the degree of finish, which are for minimizing the exchange of molds, or which are to optimize a drawing number, in order to improve efficiency of the machining process. Therefore, the groups of special express processes and normal processes are further classified into groups of machining methods, and the numerical control machining data are prepared for each of the groups.

Figure 1:
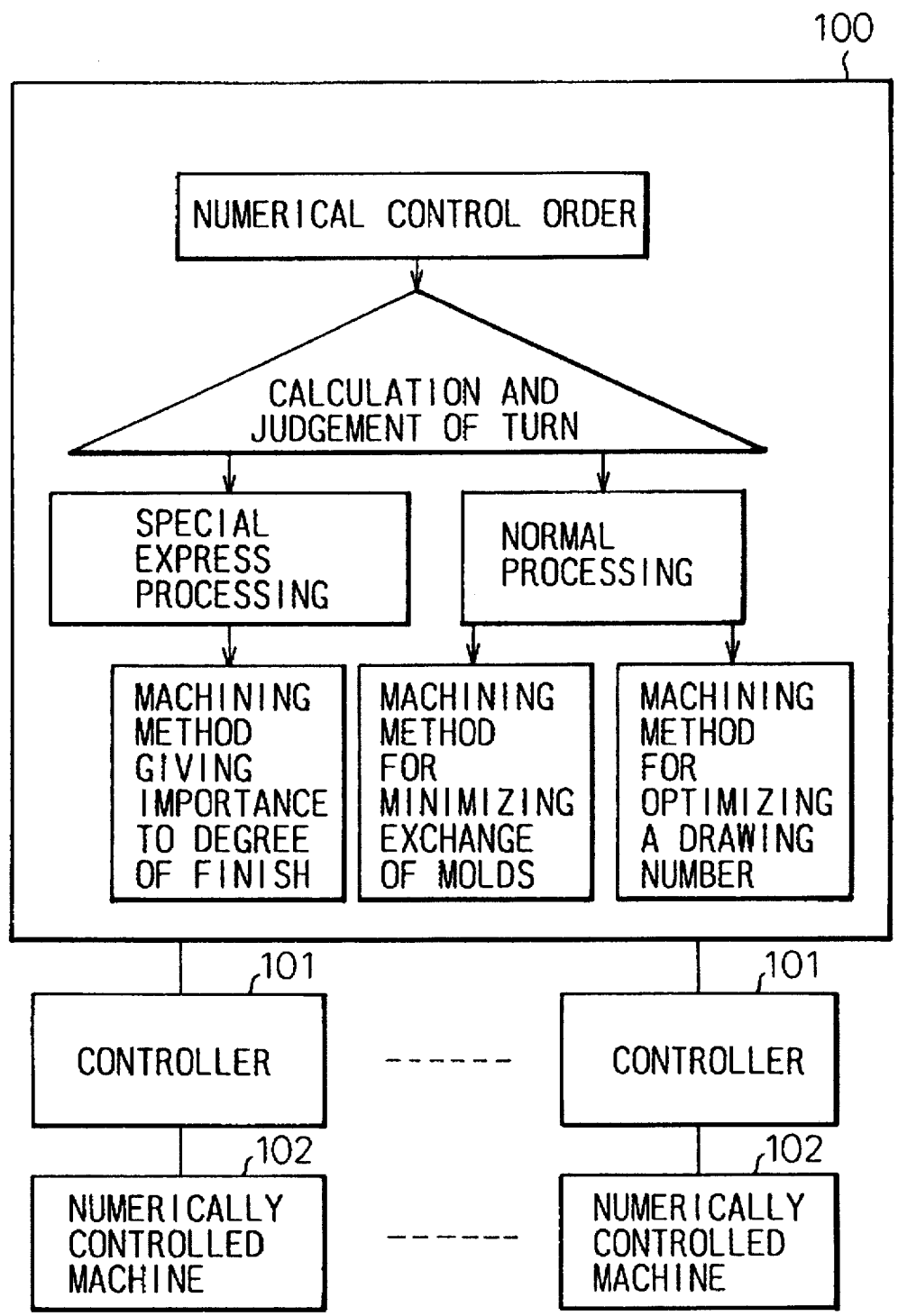
FIG. 1 is a diagram illustrating the principle of the present invention.

As shown in FIG. 1, a group of special express processes in which the turn or time of production for the numerical control order is smaller than the reference value, must have been performed within short periods of time. Therefore, these processings are classified to be of a group of machining methods giving importance to the degree of finish. Other normal processings are classified into either a group of machining methods for minimizing the exchange of molds or a group of machining methods for optimizing a drawing number whichever gives better machining efficiency by considering the tentative arrangement and machining efficiency based upon the machining data. The numerical control machining data are prepared for each of the groups.

According to the machining method which gives importance to the degree of finish, a uniform mold is used for a range of allowable sizes of many kinds of molds in order to decrease the number of kinds of the molds to be used. When the holes of various shapes are to be formed by follow-piercing, any mold that meets the follow-piercing conditions is selected as a mold for follow-piercing out of the molds selected based upon the machining data. When neither of the molds meets the follow-piercing conditions, a new mold is selected in an attempt to decrease the number of kinds of molds to be used. Therefore, the absolute number of molds that are used is decreased to decrease the frequency of exchanging the molds.

According to the machining method which gives importance to the degree of finish, a mold that is very frequently used is selected as a fixed mold. At the time of exchanging the molds, the molds that will not be used for the subsequent machining are preferentially removed to mount new molds. Then, the molds that are used for the subsequent machining but have decreased number of drawings are selectively removed. When the molds are to be further removed, the molds that were removed many times before, are selected. The molds, which are exchanged a number of times which is larger than a predetermined allowable value, are the ones that are repetitively used. Therefore, such molds are assigned to be fixed molds to decrease the number of times of exchanging the molds.

According to the machining method which gives importance to the degree of finish, furthermore, when a plurality of kinds of substrates are to be formed, such substrates are arranged in the order of decreasing outer sizes of the drawings that are to be arranged, e.g., in the order of decreasing sizes in the vertical direction. In this case, the substrates are arranged within an effective plate-utilizing range excluding the gripping margin and a useless margin at a rate which is larger than a reference value, in order to improve the average rate of arrangement.

According to the machining method for minimizing the exchange of molds, a uniform mold is used for a range of allowable sizes of many kinds of molds. When the holes of various shapes are to be formed by follow piercing, any mold that meets the follow-piercing conditions is selected as a mold for follow-piercing out of the molds selected based upon the machining data. When there is no mold that meets the follow-piercing conditions, a new mold is selected in an attempt to decrease the kinds of molds. Therefore, the absolute number of molds that are used is decreased to decrease the frequency of exchanging the molds.

According to the machining method for minimizing the number of times when molds are to be exchanged, when it is presumed that the machining in the first step is done by using a fixed mold and when there develops an empty step in a subsequent stage, part of the first step is moved to the head of the next consecutive step to fill up the empty step. When it is presumed that the machining in the first step is done by using a fixed mold and another mold and when there develops an empty step in a subsequent stage, part of the first step is moved to a step having the least machining time after the first step but before the final step, so that the machining will not be concentrated in the first step.

According to the machining method of optimizing a drawing number, the frequency of using the mold (the drawing number that is used) is found, and the molds are rearranged in such a manner that the drawings using the molds which are very frequently used are preferentially machined, in order to decrease the number of times of exchanging the molds.

According to the numerically controlled machining system, numerically controlled machines 102 such as a piercing machine, a thread cutting machine, a cutting machine, etc. are arranged to correspond to the machining steps, controllers 101 are provided for each of the numerically controlled machines 102, and the numerically controlled processor 100 prepares numerical control machining data that comply with the numerical control orders and distributes them to the controllers 101. The numerically controlled processor 100 effects the classification based upon all numerical control orders, selects the molds so as to be in time within the predetermined due term and so as to decrease the number of times of exchanging the molds, and prepares the numerical control data. The numerical control machining data are then distributed to the controllers 101.

The numerically controlled processor 100 includes a mechanism managing unit, an NC support group managing unit and a subsystem control unit. The mechanism managing unit manages the numerical control orders and load conditions of the numerically controlled machines. The NC support group managing unit effects the grouping processing based upon the numerical control orders that are input, and distributes the numerical control machining data to the controllers that control the numerically controlled machines. The subsystem control unit manages the mold master data and the machining master data that will be referred to when the numerical control machining data are to be prepared.

Figure 2:
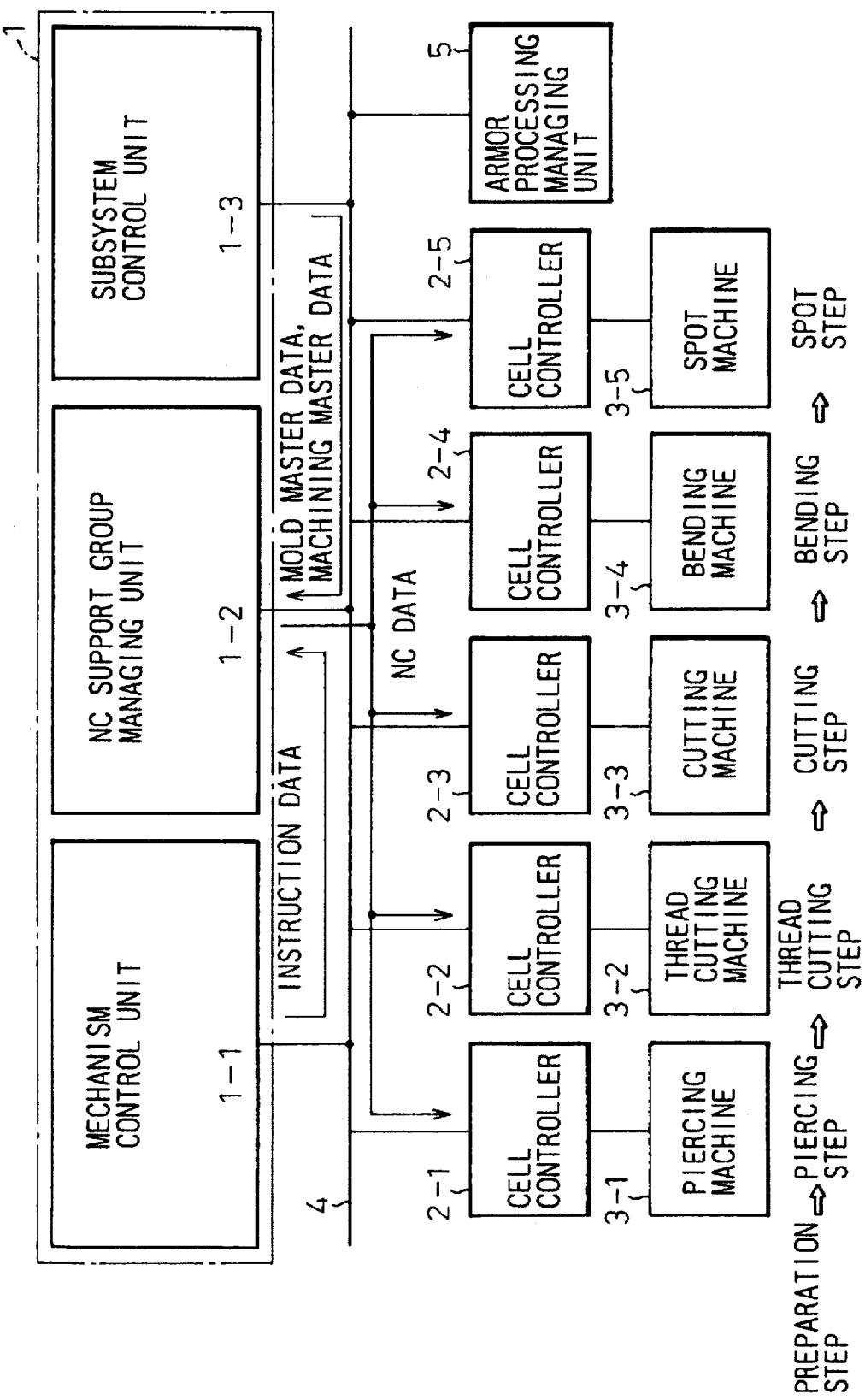
FIG. 2 is a diagram illustrating the system according to an embodiment of the present invention.

FIG. 2 is a diagram illustrating the system constitution according to an embodiment of the present invention, wherein reference numeral 1 denotes a numerically controlled processor, 1-1 denotes a mechanism control unit, 1-2 denotes an NC support group managing unit, 1-3 denotes a subsystem control unit, reference numerals 2-1 to 2-5 denote cell controllers, 3-1 denotes a piercing machine, 3-2 denotes a thread cutting machine, 3-3 denotes a cutting machine, 3-4 denotes a bending machine, 3-5 denotes a spot-welding machine, 4 denotes a communication circuit such as LAN (Local Area Network), and reference numeral 5 denotes an armor processing managing unit for managing characters and coatings.

The numerically controlled processor corresponds to the numerically controlled processor 100 of FIG. 1 and includes the mechanism control unit 1-1, NC support group managing unit 1-2 and subsystem control unit 1-3. The mechanism control unit 1-1 manages the numerical control orders that are input and sends instruction data to the NC support group managing unit 1-2. The NC support group managing unit 1-2 finds the turns or working times for all of the numerically controlled orders, compares the turns with a reference value, classifies them into special express processes and normal processes, classifies the processes into a group of machining methods giving importance to the degree of finish, into a group of machining methods for minimizing the exchange of molds and into a group of machining methods for optimizing a drawing number based upon the machining data, prepares the numerical control machining data for each of the groups, and distributes the data as numerical control machining data (NC data) to the cell controllers 2-1 to 2-5 that correspond to the controller 101 of FIG. 1.

The machines corresponding to the numerically controlled machines 102 of FIG. 1 will be a piercing machine 3-1, a thread cutting machine 3-2, a cutting machine 3-3, a bending machine 3-4 and a spot-welding machine 3-5 that are arranged corresponding to the piercing step, the thread cutting step, the cutting step, the bending step and spot-welding step in the case of producing a variety of substrates. When piercing is often effected in these steps, there will be employed, for example, eight piercing machines 3-1 and another machine.

Figure 3:
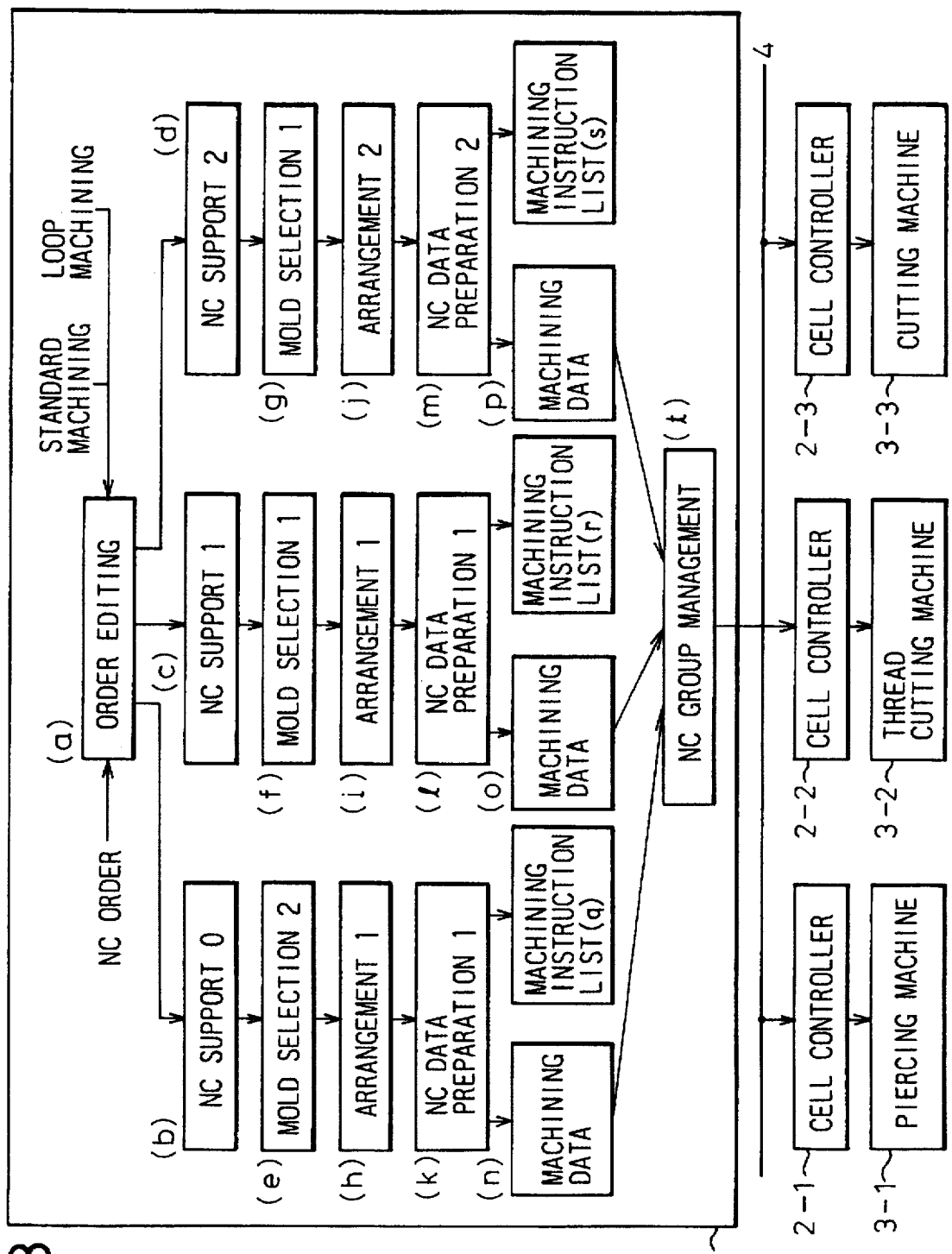
FIG. 3 is a diagram including a flow chart for explaining the processing according to the embodiment of the present invention.

FIG. 3 is a diagram including a flow chart for processing according to the embodiment of the invention, and wherein the piercing machine 3-1, thread cutting machine 3-2 and cutting machine 3-3 are arranged as numerically controlled machines. The following description deals with the case where the numerically controlled machines are arranged. It should, however, be noted that the present invention can be adapted to the cases of arranging other kinds of numerically controlled machines, as a matter of course.

The numerically controlled processor 1 includes processing steps (a) to (t). The step (a) edits the orders based upon a plurality of numerical control orders (NC orders) inclusive of product numbers, drawing numbers, editing, number of instructions, due term, line numbers, etc. that are input, standard machining data inclusive of drawing numbers, number of molds, shapes of holes and coordinates that are stored in the subsystem control unit 1-3, and loop machining data inclusive of drawing numbers, edition, molds and coordinates.

The step (a) for editing the orders classifies the orders into NC supports 0, 1 and 2 ((b), (c) and (d)) based on the due terms and the machining data. The NC support 0 corresponds to the machining method for optimizing a drawing number, the NC support 1 corresponds to the machining method giving importance to the degree of finish, and the NC support 2 corresponds to the machining method for minimizing the number of times of exchanging the molds.

The NC support 0 (b) includes processing steps of mold selection 2 (e), arrangement 1 (h), NC data preparation 1 (k), NC machining data (n) and machining instruction list (q), the NC support 1 (c) includes processing steps of mold selection 1 (f), arrangement 1 (i), NC data preparation 1 (1), NC machining data (o) and machining instruction list (r), and the NC support 2 (d) includes processing steps of mold selection 1 (g), arrangement 2 (j), NC data preparation 2 (m), NC machining data (p) and machining instruction list (s). The NC machining data are distributed by the NC group management (t) to the cell controllers 2-1 to 2-3.

Figure 4:
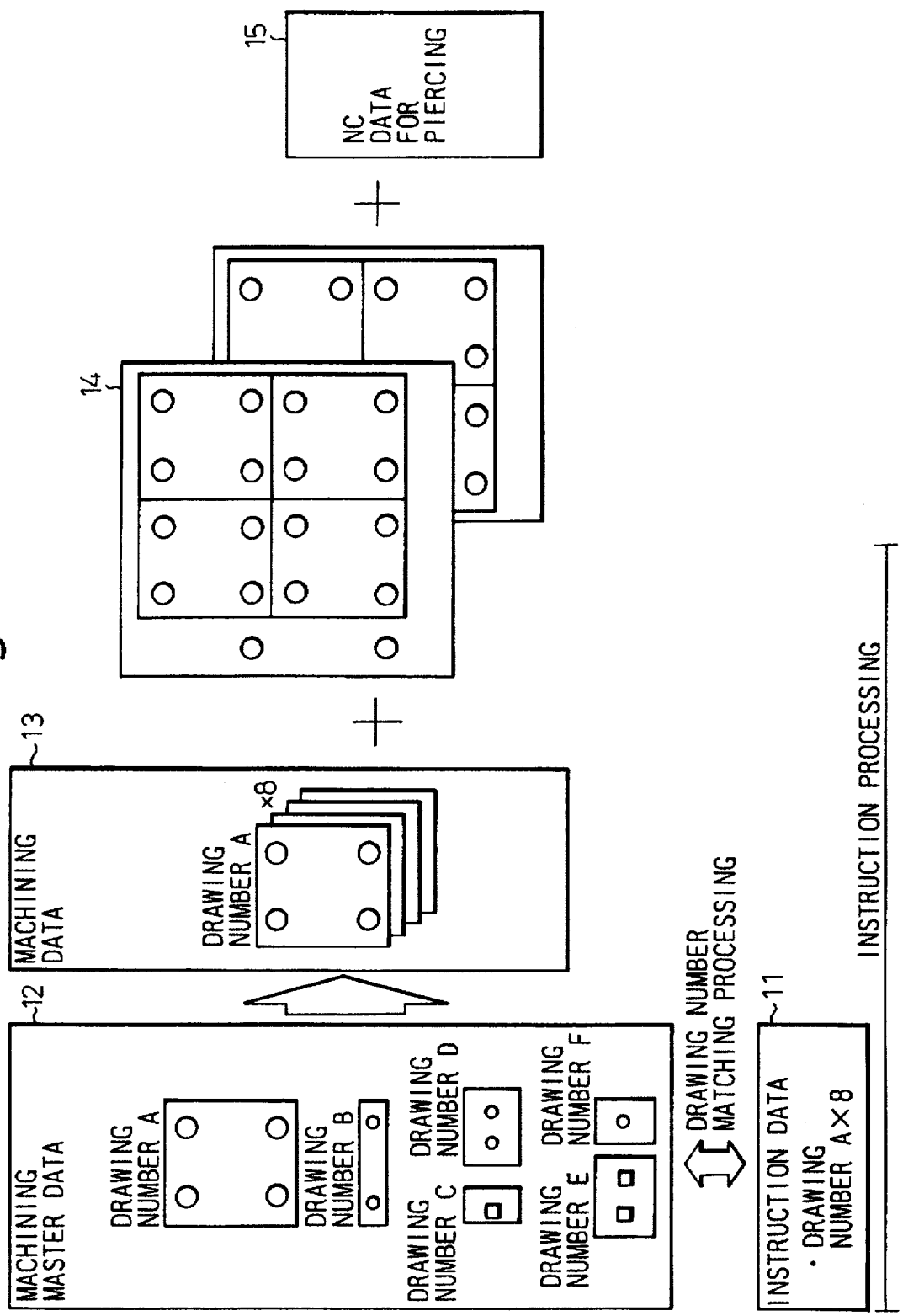
FIG. 4 is a diagram which schematically illustrates an NC support 0.

FIG. 4 is a diagram which schematically illustrates the NC support 0 which does not execute thread cutting and also does not have a cutting step since the cold punching is effected by the piercing. The NC support 0 executes, as the instruction processing, the drawing number matching processing between the instruction data 11 and the machining master data 12, uses the drawing number of instruction data as machining data 13, e.g., uses the drawing number A as the machining data 13 by matching the drawing number A with the drawing number A in the machining master data, arranges the data on the substrate 14, and prepares NC data 15 for piercing.

Figure 5:
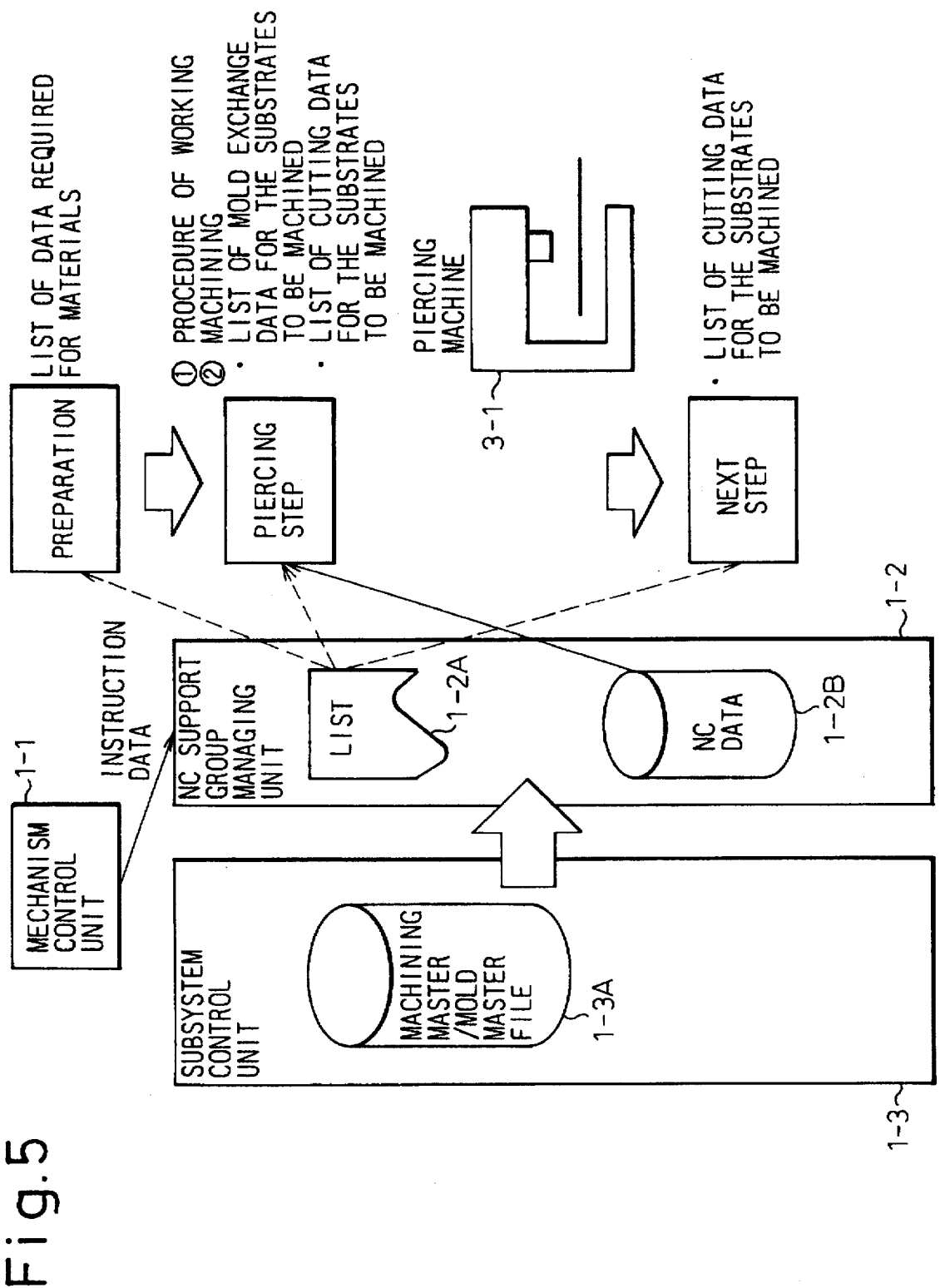
FIG. 5 is a diagram which illustrates the NC support 0.

FIG. 5 is a diagram illustrating the NC support 0 wherein in response to instruction data from the mechanism control unit 1-1, the NC support group managing unit 1-2 makes reference to a machining master/mold master file 1-3A in the subsystem control unit 1-3, prepares a variety of lists 1-2A and NC data 1-2B, and transfers a list of machining conditions to the person (not shown) who manages the steps. The preparation step uses a list of data required for the materials, and the piercing step uses a list of mold exchanging data for the substrates to be machined and a list of cutting data for the substrates to be machined. The list of cutting data for the substrates to be machined is added as a ticket for each of the products.

In the preparation step, a substrate of a size in compliance with the list of data required for materials is prepared. In the piercing step using the piercing machine 3-1, furthermore, a mold is mounted according to the list of mold exchange data for the substrates to be machined and, then, the piercing is executed according to the NC data 1-2B in the order of substrates in compliance with the list of mold exchange data for the substrates to be machined. In this case, neither the thread cutting step nor the cutting step are executed since the cold punching is effected as described above.

Figure 6:
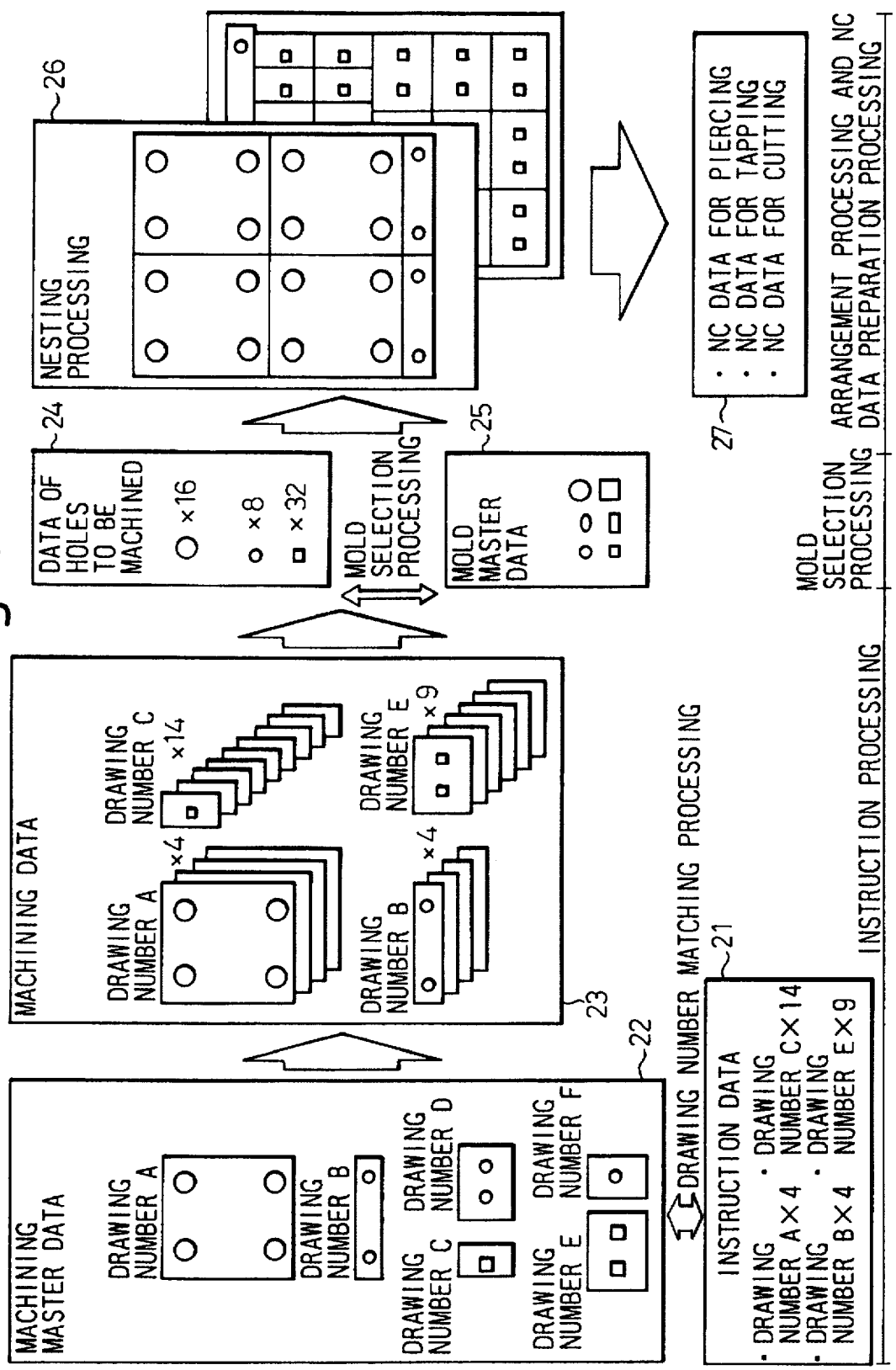
FIG. 6 is a diagram which schematically illustrates NC supports 1 and 2.

FIG. 6 is a diagram which schematically illustrates the NC supports 1 and 2 which execute, as an instruction process, the drawing number matching process between the instruction data 21 and the machining master data 22, and prepares machining data 23. The NC supports 1, 2 then prepare, as a mold selection processing, the data of holes to be machined by making reference to the mold master data 25. Then, as the arrangement processing and NC data preparation processing, the nesting (arrangement) processing 26 is executed, and NC data 27 are prepared including NC data for piercing, NC data for tapping and NC data for cutting.

Figure 7:
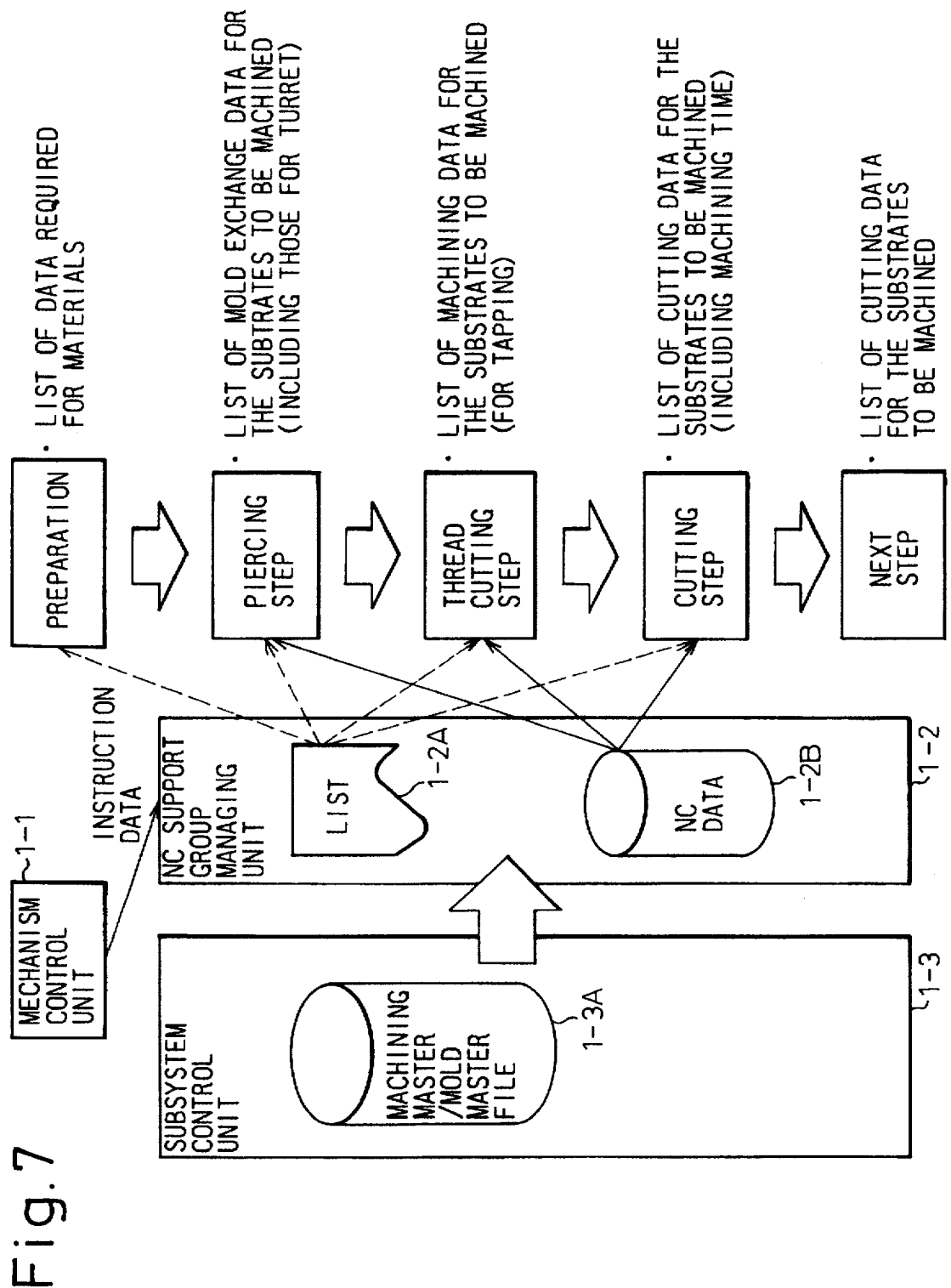
FIG. 7 is a diagram which illustrates the NC support 1.

FIG. 7 is a diagram explaining the NC support 1 wherein in response to the instruction data from the mechanism control unit 1-1, the NC support group managing unit 1-2 makes reference to a machining master/mold master file 1-3A in the subsystem control unit 1-3, prepares a variety of lists 1-2A and NC data 1-2B, and transfers a list of machining conditions to a person (not shown) who manages the steps. Furthermore, the preparation step uses a list of data required for the materials, the piercing step uses a list of mold exchange data for the substrates to be machined, the thread-cutting step uses a list of machining data for the substrates to be machined, the cutting step uses a list of cutting data for the substrates to be machined, and the next step adds the list of cutting data, for the substrates to be machined, as a ticket.

The preparation step prepares a substrate of a size that complies with the list of data of materials. In the piercing step, a piercing or punching mold is mounted on the piercing machine in compliance with the list of mold exchange data for the substrates to be machined, and the piercing is executed in accordance with the NC data 1-2B. In the thread-cutting step, a tap is mounted on the thread cutting machine in accordance with the cutting data for the substrates to be machined, and the thread cutting is executed according to the NC data 1-2B. The cutting step executes the cutting by using a cutting machine in accordance with the list of cutting data for the substrates to be machined.

FIG. 8 is a diagram explaining the NC support 2 wherein, in response to the instruction data from the mechanism control unit 1-1, the NC support group managing unit 1-2 makes reference to the machining master/mold master file 1-3A in the subsystem control unit 1-3, prepares a variety of lists 1-2A and NC data 1-2B, and transfers a list of machining conditions to the person (not shown) who manages the steps. The preparation step uses a list of data required for the materials and a list of material mounting data, and the piercing step uses a list of mold exchange data for the steps, a list of step data for the racks and a list of material mounting data. The thread cutting step uses a list of machining data for the racks and a list of material mounting data, and the cutting step uses a list of machining data for the racks, a list of material mounting data and a list of cutting data. In the next step, the list of cutting data is added, as a ticket to each of the products.

In the preparation step, the substrate 30 is mounted on the rack 31 depending upon the list of data required for the materials and the list of material mounting data. On the rack 31 can be mounted, for instance, 45 individual substrates 30. In the piercing step, the piercing mold is mounted according to the list of mold exchange data for the steps, and the piercing is executed in the order of racks according to the list of step data for the racks and in compliance with the NC data 1-2B. In the thread cutting step, the thread cutting is effected in the order of racks according to the list of machining data for the racks and in compliance with the NC data 1-2B. In the cutting step, the cutting is effected in the order of racks according to the list of machining data for the racks and in compliance with the list of cutting data.

Figure 9A:
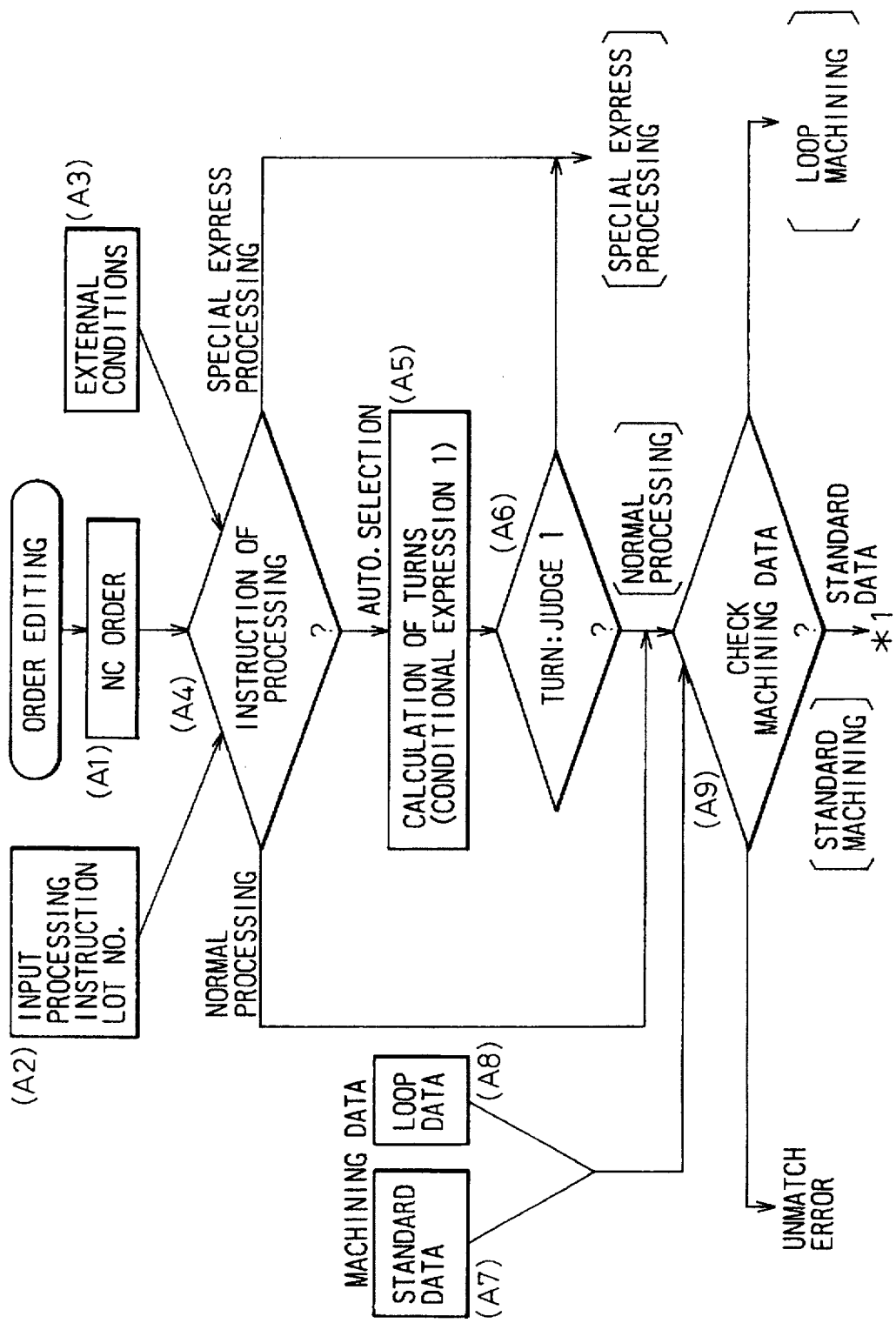
FIGS. 9A and 9B are flow charts of an order edit processing according to the embodiment of the present invention.
Figure 9B:
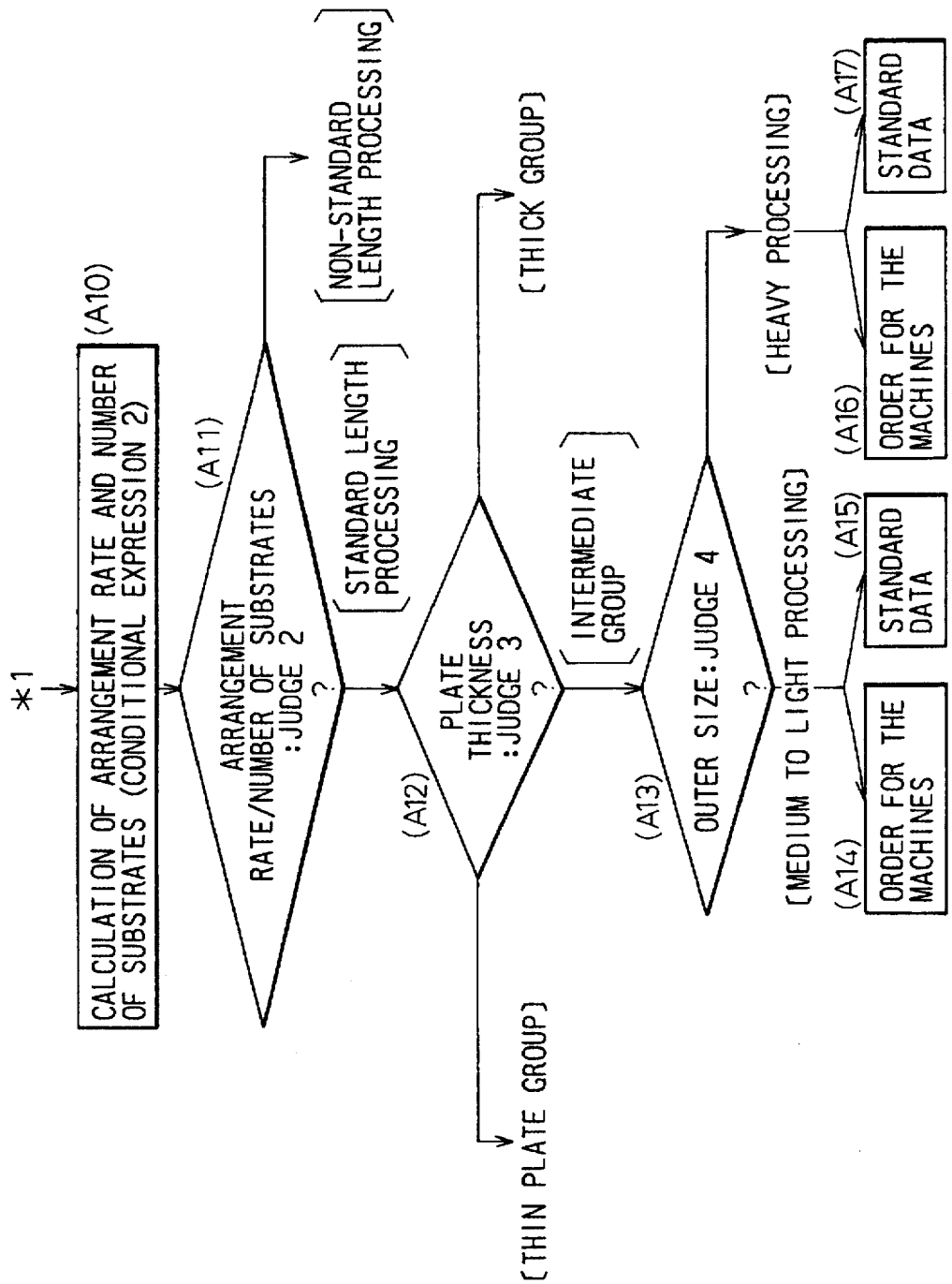

FIGS. 9A and 9B are flow charts of order edit processing according to the embodiment of the present invention, explaining steps (A1) to (A17). An NC order (A1) includes product number, drawing number, editing, order management number, grade, instruction number, date of starting the work, due term, manual operation, passage of steps, etc., inputs, as required, a processing instruction lot No. (A2) and a variety of external conditions (A3).

It is judged whether the instruction of processing is a special express process, an automatic selection process or a normal process (A4). When the instruction of processing is the one other than the automatic selection processing, the special express processing or the normal processing is executed unconditionally. In the case of the automatic selection processing, the turn is calculated according to the conditional expression 1 (A5), and the turn is judged under the judging condition 1 (A6).

FIGS. 10A and 10B are diagrams explaining the conditional expression according to the embodiment of the present invention, wherein the FIG. 10A explains conditional expressions 1 and 2, and the FIG. 10B explains the size of the substrate. FIG. 11 is a diagram explaining the judging conditions according to the embodiment of the present invention, including judging conditions 1 to 4.

As represented by the conditional expression 1 in FIG. 10A, the turn at the step (A5) of FIGS. 9A and 9B is found by calculating the production turn=NC due term of order—date of starting NC work of order. At the step (A6), a reference value which is set to be 7 days is compared with the production turn, the process is judged to be a special express process in compliance with the judgement 1 of FIG. 11 when the production turn is smaller than the reference value of 7 days, and the process is judged to be a normal process when the production turn is larger than the reference value of 7 days.

When the process is judged to be the normal process, the machining data are checked (A9) by making reference to the standard data (A7) in the machining data and to the loop data (A8). When the data are judged to be loop data, loop machining is executed and when the data are judged to be standard data, standard machining is executed. To execute the standard process, first, the arrangement rate and the number of individual substrates are calculated in compliance with the conditional expression 2 (A10) in the diagram of FIG. 10A. In this case, the relationships between the effective size X of substrate, effective size Y of substrate, size X of drawing number and size Y of drawing number are as shown in FIG. 10B.

Next, relying upon the arrangement rate and the number of substrates, it is judged whether the processing is a non-standard-length processing or a standard-length processing in compliance with the judgement 2 of FIG. 11. According to the judgement 2 of FIG. 11, the processing is judged to be the non-standard-length processing when the arrangement rate is smaller than 60% and the number of substrates is larger than 10 pieces and when the arrangement rate is larger than 60% and the number of substrates is larger than 20 pieces. In other cases, the processing is judged to be the standard-length processing.

When the processing is judged to be the standard-length processing, the judgement is rendered (A12) depending upon the thickness of the substrate in compliance with the judgement 3 of FIG. 11. That is, the processings are classified into a thin group, an intermediate group and a thick group depending on the thickness of the substrate. In the case of the intermediate group, the judgement is rendered (A13) depending upon the outer size in compliance with the judgement 4 of FIG. 11. That is, the processes are divided into an intermediate-to-light process depending upon the size X of the drawing number and the size Y of the drawing number. As for the intermediate-to-light processing, orders (A14) for the machines and reference data (A15) are prepared. As for the heavy processing, orders (A16) for the machines and reference data (A17) are prepared.

Figure 12:
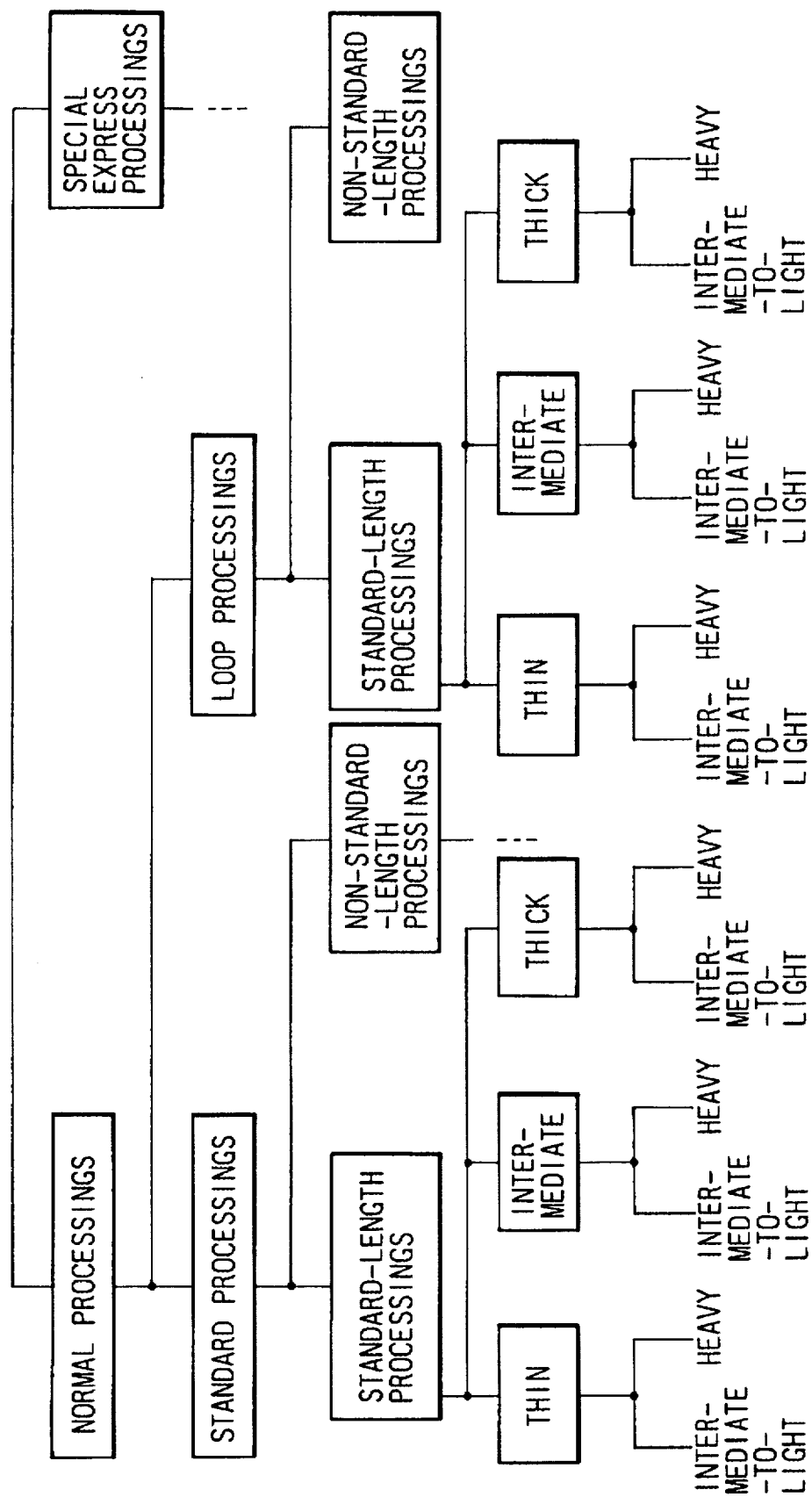
FIG. 12 is a diagram illustrating orders depending on processings and machines.

FIG. 12 is a diagram illustrating orders for the processes and the machines, which can be grouped into the normal processes and the special express processes. The normal processes can be grouped into standard machining and loop machining, which can be further grouped into standard-length processes and non-standard-length processes, respectively. Depending upon the thicknesses of the substrates, these processes can be classified into a thin group, an intermediate group and a thick group, and can further be classified into intermediate-to-light processes and heavy processes depending upon the sizes.

Figure 13:
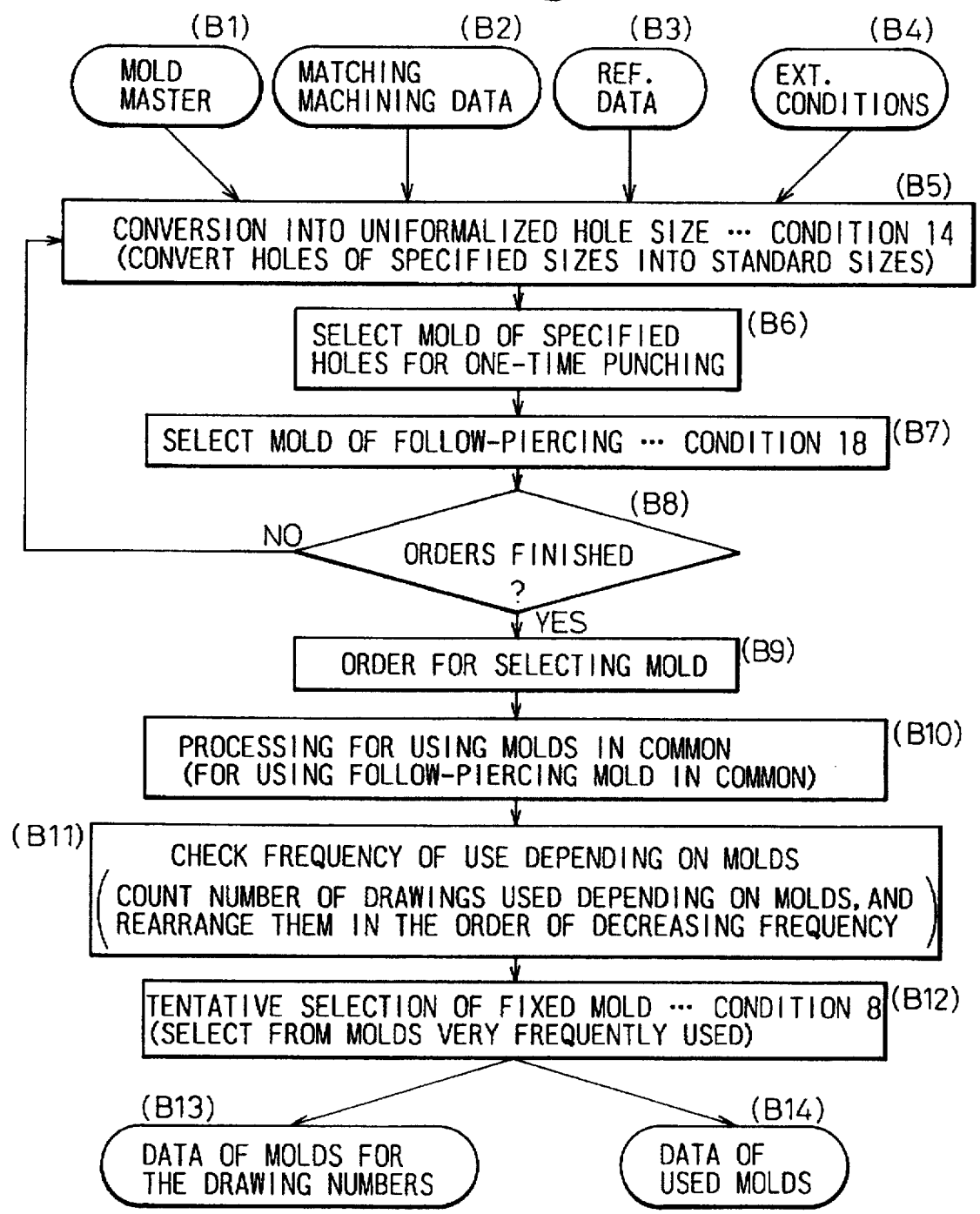
FIG. 13 is a flow chart of mold selection 1 according to the embodiment of the present invention.
Figure 14:
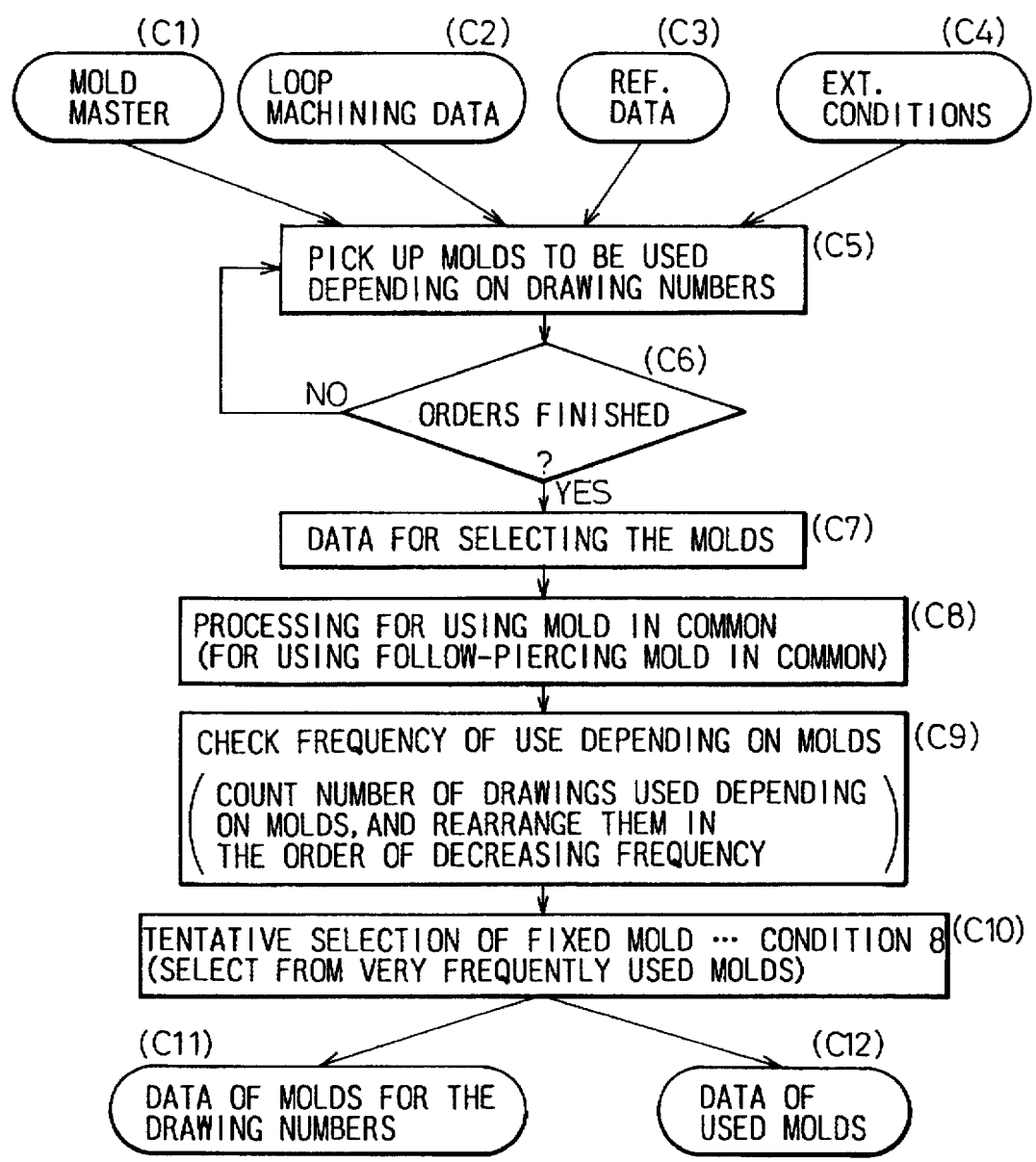
FIG. 14 is a flow chart of mold selection 2 according to the embodiment of the present invention.

FIG. 13 is a flow chart illustrating the mold selection 1 according to the embodiment of the present invention, FIG. 14 is a flow chart illustrating the mold selection 2 according to the embodiment of the present invention, and FIG. 15 is a diagram illustrating the data of conditions according to the embodiment of the present invention. FIG. 13 illustrates the process of the mold selection 1 at the steps (f) and (g) in FIG. 3, and wherein holes of specified sizes are uniformalized within a range of allowable sizes and are converted into standard sizes (B5) based upon the mold master (B1), matching machining data (B2), reference data (B3) and external conditions (B4). The conditions in this case represent a range of allowable sizes in compliance with conditional data in a file shown in FIGS. 15A to 15C. Though there may exist a number of conditions, FIGS. 15A to 15C illustrate conditions 1 through up to 32 wherein file names, Japanese language file names and their outlines correspond to one another.

Next, a mold for specified holes for one-time punching is selected (B6), and a mold for follow-piercing is selected (B7) according to the follow-piercing condition 18. It is then judged whether the processings for the orders are finished or not (B8). After the processings are finished, the data for selecting the mold are obtained (B9). Based upon the data for selecting the mold, the processing is executed for using the follow-piercing mold in common (B10). Then, the number of drawings is counted depending upon the molds, frequency of use is checked, depending on the molds, to rearrange them in the order of decreasing number of count (B11), a fixed mold is tentatively selected from the molds that are frequently used depending upon the condition 8 (B12), and the data of molds for the drawing number (B13) and the data of the used molds (B14) are formed.

FIG. 14 illustrates the processing of mold selection 2 at the step (3) in FIG. 3, and wherein the molds to be used are selected depending upon the drawing numbers (C5) based on a mold master (C1), loop machining data (C2), reference data (C3) and external conditions (C4), it is judged whether the processes for the orders are finished nor not (C6), and the data for selecting the molds are obtained (C7) at the end of the processes. Then, a process is executed for using the follow-piercing mold in common (C8), the number of used drawings is counted depending upon the molds, the frequency of use is checked (C9) depending upon the molds to rearrange them in the order of decreasing frequency, a fixed mold is tentatively selected from the very frequently used molds in accordance with the condition 8 (C10), and the data of molds for the drawing number (C11) and the data of the used molds (C12) are formed.

Figure 16A:
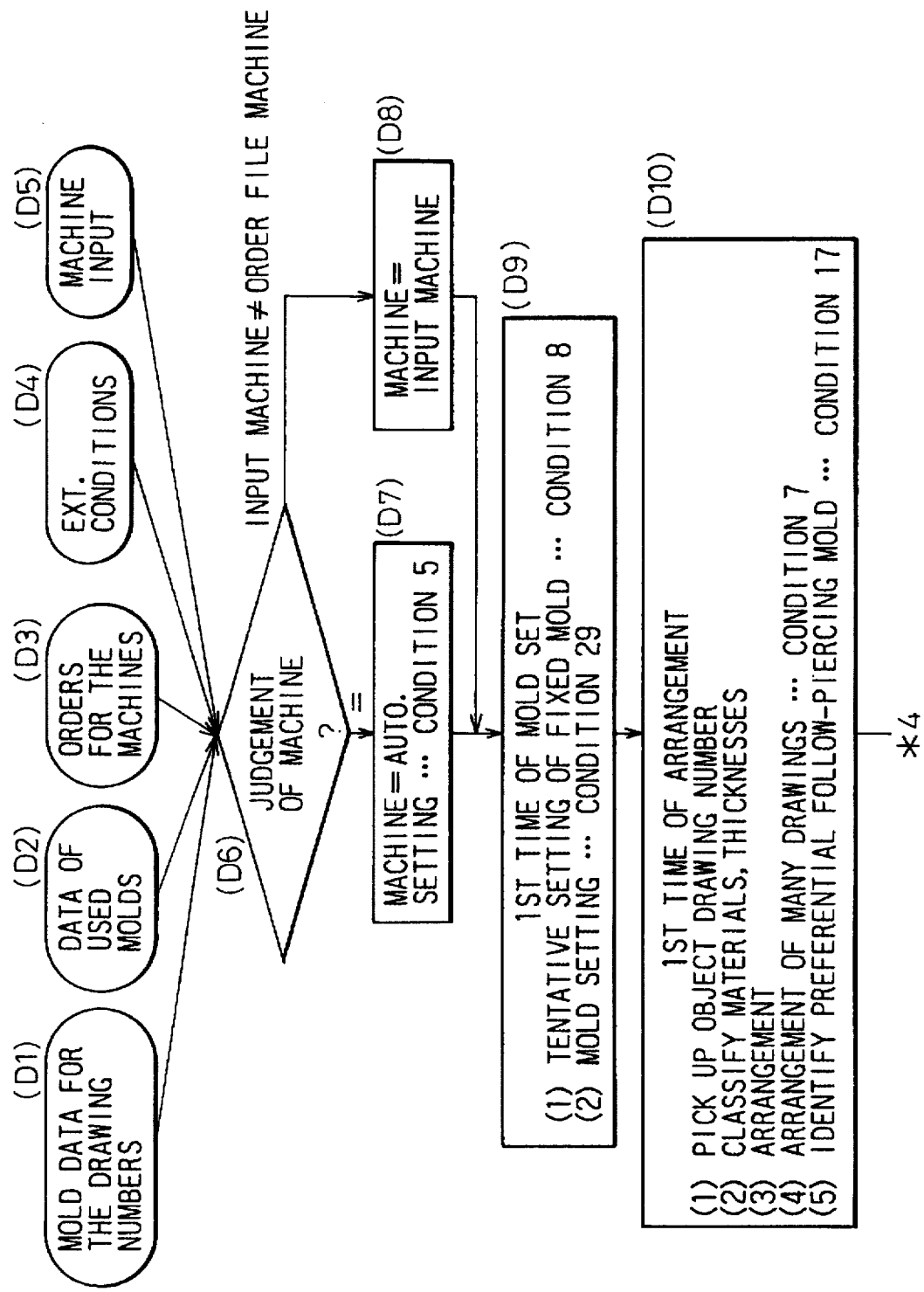
FIGS. 16A and 16B are flow charts of arrangement 1 according to the embodiment of the present invention.
Figure 16B:
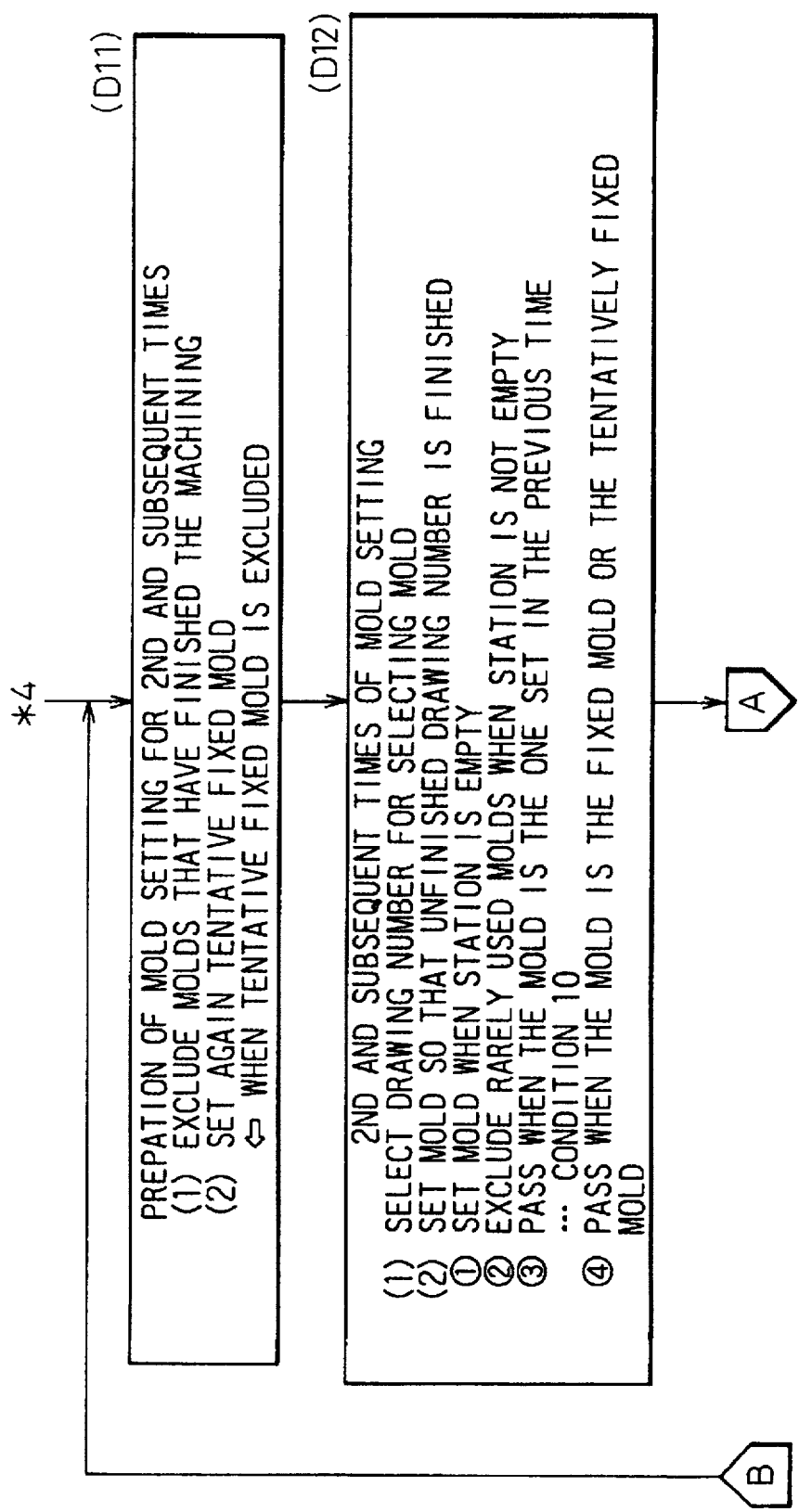
Figure 17:
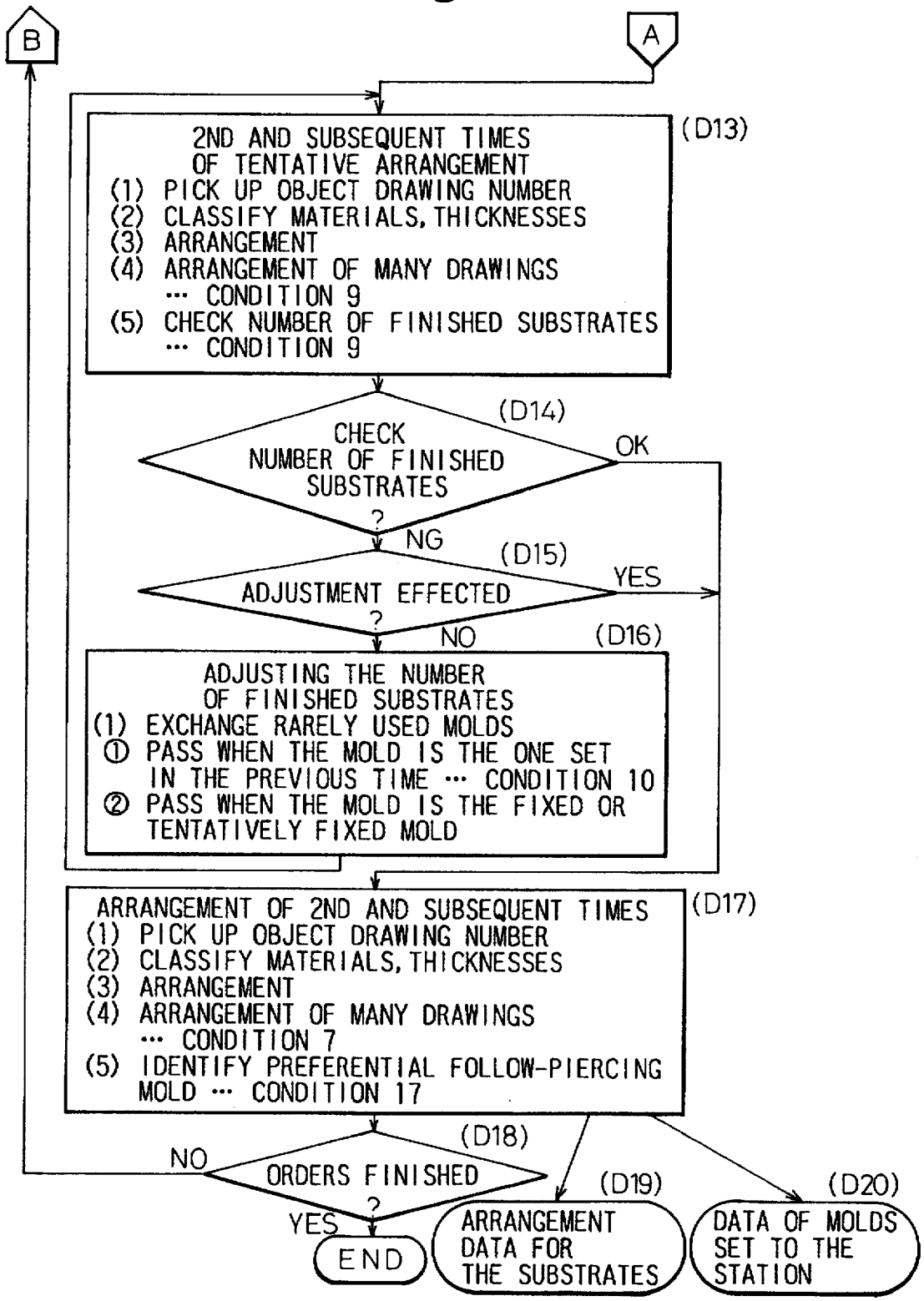
FIG. 17 is a flow chart of arrangement 1 according to the embodiment of the present invention.

FIGS. 16A, 16B and 17 are flow charts illustrating the arrangement 1 according to the embodiment of the present invention, i.e., illustrating the processing for arrangement 1 at the steps (h) and (i) in FIG. 3. The machine is judged (D6) based upon the mold data (D1) for the drawing number, data of the used mold (D2), orders for the machines (D3), external conditions (D4) and input of the machine (D5). In this case, since the machine has been set to meet the orders, the machine=automatic setting is established (D7) in accordance with the condition 5 of machine number for the files of order classifications when there is no machine input (D5). When a machine number different from the order file machine is input by the machine input (D5), the relation becomes input machine ≠ order file machine. In this case, priority is given to the input machine so that machine=input machine (D8).

Next, the mold is set for the first time (D9). Several molds having round holes of small diameters that are usually used are set as fixed molds and the tentatively fixed molds that are used are limited to the immediate order only. That is, several molds that are very frequently used are temporarily set to be fixed molds. Tentatively fixed molds are selected from the highly frequently used molds according to the condition 8, and then the molds are set to the station in the order of decreasing use frequency in accordance with the condition 29.

Next, the first arrangement is executed (D10). That is, (1) an object drawing number is selected that will be finished by only the molds that are set this time, (2) the drawings are classified depending upon the materials and thicknesses in order to classify the materials and the thicknesses, (3) the drawing numbers equal to the number of instructions are arranged on the substrate of a specified size, (4) many drawings are arranged according to the condition 7 when the arrangement rate of the substrate is smaller than a specified condition, and (5) a preferential punching mold is identified according to the condition 17 based upon the shapes and sizes.

Next, the mold setting is prepared for the second and subsequent times (D11). That is, (1) the molds that have finished machining are removed and (2), in the case of excluding the tentatively fixed molds, the next tentatively fixed mold is set again. Then, the mold is set in the second and subsequent times (S12). That is, (1) the drawing for selecting the mold is selected and (2) the mold is so set that the unfinished drawing number is finished. In this case, when the station is empty, the mold that will be used next is set. When the station is not empty, the molds that are rarely used are excluded to make the station empty. When the mold is the one that was set during the previous time, the operation is passed-over (the mold is not excluded) according to the condition 10. When the mold is a fixed mold or is a tentatively fixed mold, the operation is passed-over (the mold is not excluded).

Next, the second and subsequent times of tentative arrangement are executed (D13). That is, (1) the object drawing number is selected, (2) materials and thicknesses are classified, (3) drawings are arranged, (4) many drawings are arranged according to the condition 7, and (5) the number of the finished substrates is checked according to the condition 9. By checking the number of the finished substrates (D14), it is judged whether the operation is OK or is not good. When the operation is OK, the program proceeds to a step (D17) and when the operation is not good, the program proceeds to a step (D15). When the number of the finished substrates is not in agreement with a specified number, a step (D15) judges whether the adjustment has been effected or not. When the number of the finished substrates fails to reach the predetermined number despite the adjustment is effected, the program proceeds to a step (D17). When the adjustment has not been effected, the program returns back to the step (D16).

A step (D16) adjusts the number of the finished substrates and (1) exchanges the molds which are rarely used. That is, the molds that have been set but that are rarely used are removed, and other molds are set. In this case, when the mold is the one that was set the previous time, the operation is passed-over (the mold is not removed) according to the condition. When the mold is a fixed mold or is a tentatively fixed mold, the operation is passed-over (the mold is not removed). By executing such processings, the program returns back to step (D13).

In step (D17), which executes the arrangement of the second and subsequent times, (1) the object drawing number is picked up which will be finished with only the molds that are set this time, (2) drawing numbers are classified depending on materials and thicknesses, to classify materials and thicknesses, (3) drawings of a number equal to the number of instructions are arranged on the substrate of a specified size, (4) many drawings are arranged according to the condition 7 when the arrangement rate of the substrate is smaller than a specified value, (5) preferential piercing mold is identified relying upon the shapes and sizes according to the condition 17, arrangement data depending on substrates (D19) and data of molds set to the station (D20) are formed, whether the orders are finished or not is judged, and the program proceeds to the step (D11) when the orders are not finished.

Figure 18:
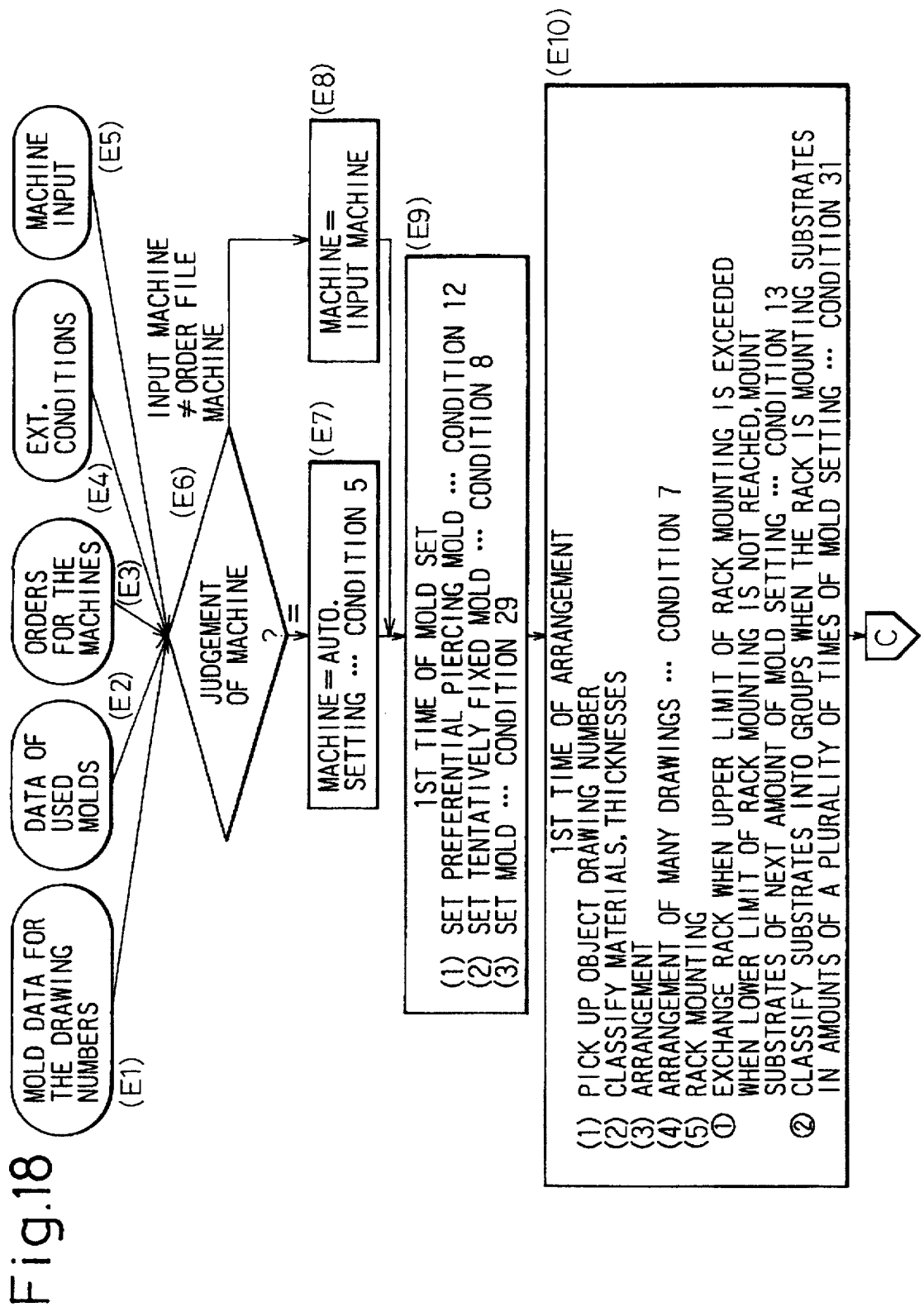
FIG. 18 is a flow chart of arrangement 2 according to the embodiment of the present invention.
Figure 19:
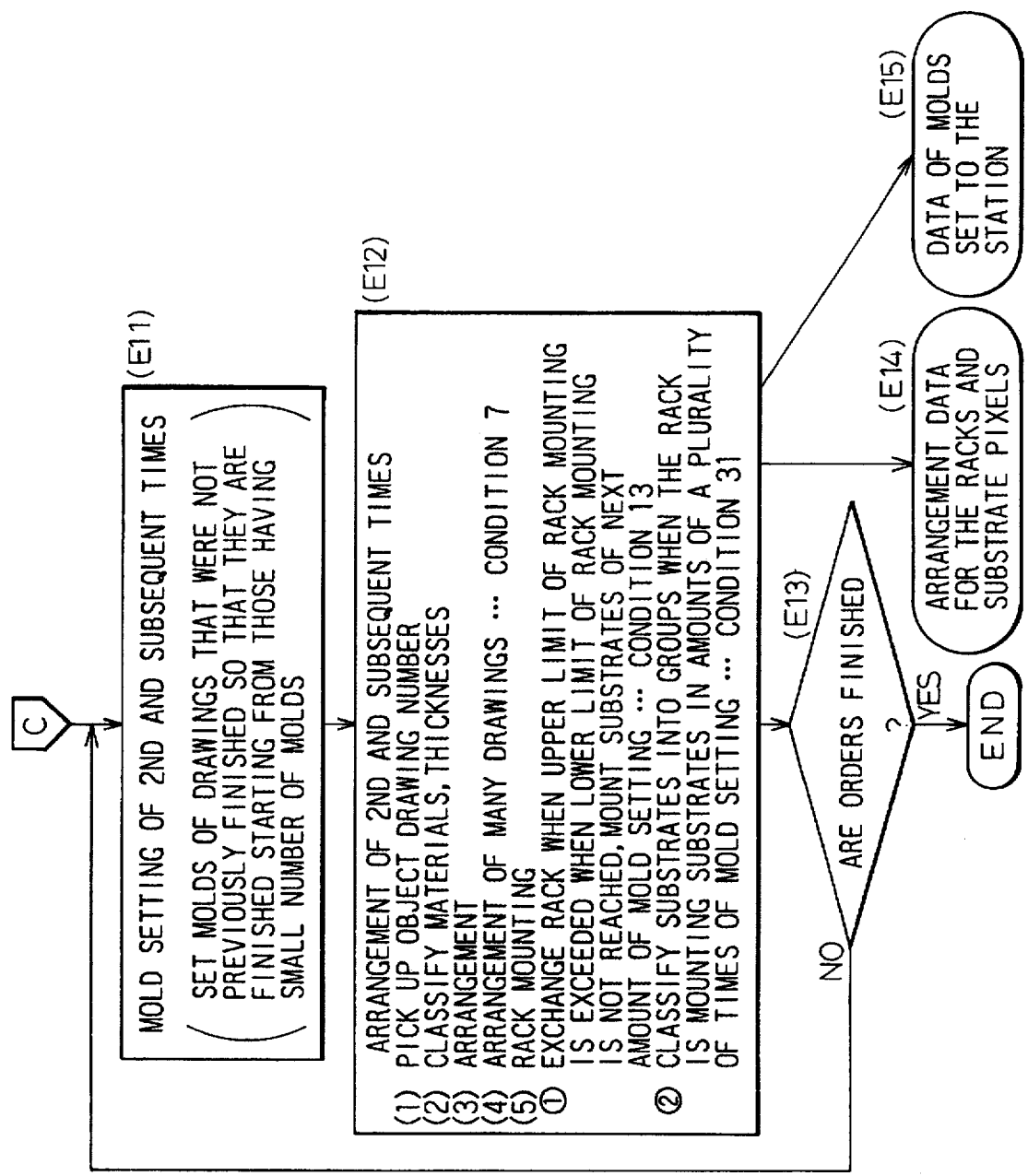
FIG. 19 is a flow chart of arrangement 2 according to the embodiment of the present invention.

FIGS. 18 and 19 are flow charts illustrating the arrangement 2 according to the embodiment of the present invention, i.e., illustrating the arrangement 2 at the step (j) in FIG. 3. The machine is judged (E6) based on the mold data for the drawing numbers (E1), data of used molds (E2), orders for the machines (E3), external conditions (E4) and machine input (E5). In this case, since the machine has been set to meet the orders, machine=automatic setting is established (D7) in accordance with the condition 5 of machine number depending upon the files of order classifications when there is no machine input (D5). When a machine number different from the order file machine is input by the machine input (D5), furthermore, the relation becomes input machine ≠ order file machine. In this case, priority is given to the input machine so that machine=input machine (D8).

Next, the mold is set for the first time (E9). That is, (1) the preferential piercing mold identified depending on the shape and size is set to the station according to the condition 12, (2) a very frequently used mold is assigned as a tentatively fixed mold according to the condition 8, and (3) the molds are set to the station in the order of decreasing their use frequency according to the condition 29.

Next, the first time of arrangement is effected (E10). That is, (1) the whole drawing numbers to be machined with the set molds are picked up and, then, drawing numbers that can be finished are picked up so as to be distinguished as arranged drawing numbers, (2) drawing numbers are classified depending on the materials and thicknesses to group materials and thicknesses, (3) drawings of a number equal to the number of instructions are arranged on the substrate of a specified size, (4) many drawings are arranged according to the condition 7 when the arrangement rate of the substrate is smaller than a specified value, and then (5) rack mounting is executed. In the rack mount processing, the rack is exchanged according to the condition 13 when the upper limit of rack mounting is exceeded, and substrates of a next amount of mold setting are mounted on the rack when the lower limit of rack mounting is not reached. According to the condition 31, furthermore, the mounted substrates are classified on a rack that is mounting the substrates in amounts of a plurality of times of mold setting.

Set the molds in the second and subsequent times (E11). That is, set the molds of drawings that were not previously finished so that they are finished starting from those having small number of molds (E12). That is, (1) the drawing numbers to be finished by the machining using the molds that are set this time are picked up, (2) drawing numbers are classified depending on the materials and thicknesses to group materials and thicknesses, (3) drawings of a number equal to the number of instructions are arranged on the substrate of a specified size, (4) many drawings are arranged according to the condition 7 when the arrangement rate of the substrate is smaller than a specified value, and then (5) rack mounting is executed. In the rack mount processing, the rack is exchanged according to the condition 13 when the upper limit of rack mounting is exceeded as in the case of the step (E10), and substrates of a next amount of mold setting are mounted on the rack when the lower limit of rack mounting is not reached. According to the condition 31, furthermore, the mounted substrates are grouped on a rack that is mounting the substrates in amounts of a plurality of times of mold setting. Then, there are formed arrangement data for the racks and substrates (E14) and data of molds set to the station (E15). It is further judged whether the orders are finished or not (E13). When the orders are not finished, the program proceeds to the step (E11).

FIG. 20A is a flow chart illustrating the NC data preparation 1 according to the embodiment of the present invention, i.e., illustrating the processing of NC data preparation 1 at the steps (k) and (l) of FIG. 3. Piercing data are prepared (F5) based on the data of molds set to the station (F1), arrangement data (F2) for the substrates, external conditions (F3) and reference data (F4) that are obtained through the aforementioned processing of arrangement 1. That is, (1) arrangement data for the substrates and reference data are converted into coordinates from the origin of the substrate represented by a black circle in FIG. 20B on the right side. The substrate is secured to the clamping portions of the machine, and origins of a plurality of drawings are denoted by a mark X. Then, (2) based upon the data of molds set to the station, the piercing order is determined according to the condition 17 relying upon the shapes and sizes of the molds, and (3) locus processing is executed. In the locus processing, the start position is changed depending on the piercing order, the coordinates are rearranged so that the machining proceeds along a meandering locus indicated by solid-line arrows or dotted-line arrows in the diagram (b) of the right side, and the layer of the Y-direction has the size Y of the drawing number that is arranged.

Next, tapping data are formed (F6). That is, (1) materials are grouped, and the station, descending speed and the revolving speed of the drill are set depending upon the materials and according to the condition 16, (2) data of holes to be tapped are picked up, converted into coordinates from the origin of the substrate, commands that are not related to tapping are cut according to the condition 28, command coordinates are decomposed, data of tapped holes are picked up, and (3) the locus processing is executed in which the machining moves in a meandering manner as represented by solid-line arrows or dotted-line arrows in FIG. 20C on the right side as in the case of preparing the piercing data.

Next, the cutting data are prepared (F7). That is, (1) the origin of the drawing number that is arranged is picked up, converted into coordinates from the origin of the substrate thereby to pick up a cutting point, (2) the size Y of the remaining material is calculated, the rank of the remaining material is determined depending on the size Y according to the condition 6, and (3) when the remaining size Y is larger than the specified value, coordinates are generated for cutting with the specified value thereby to execute the substrate regeneration processing to prepare a substrate smaller than the present size. This means that when the remaining material has a size L and the small substrate has a size $L_1$ as shown in FIG. 20D on the right side, the substrate having a relation $L > L_1$ can be prepared as a regenerated substrate from the remaining substrate. That is, the substrate can be effectively utilized. The NC data (F8) are prepared by the above-mentioned processing.

FIG. 21A is a flow chart of NC data preparation 2 according to the embodiment of the present invention, and illustrates the processing of NC data preparation 2 at the step (m) in FIG. 3. Based upon the data of molds set to the station (G1) obtained through the above-mentioned processing of arrangement 2, arrangement data (G2) for the substrates, external conditions (G3) and reference data (G4), and piercing data are prepared (G5) in the same manner as the above-mentioned step (F5). That is, (1) arrangement data for the substrates and reference data are converted into coordinates from the origin of the substrate represented by a black circle in FIG. 21B on the right side. The substrate is secured to the clamping portions of the machine, and origins of a plurality of drawings are denoted by a mark X. Then, (2) based upon the data of molds set to the station, the piercing order is determined according to the condition 17 relying upon the shapes and sizes of the molds, and (3) locus processing is executed. In the locus processing, the start position is changed depending on the piercing order, the coordinates are rearranged so that the machining proceeds along a meandering locus indicated by solid-line arrows or dotted-line arrows in FIG. 21C on the right side, and the layer of the Y-direction has the size Y of the drawing number that is arranged.

Next, the machining time is adjusted between the steps (G6). That is, the machining time is calculated depending on the racks when the fixed mold, tentatively fixed mold, preferential piercing mold, etc. are preferentially set. For the rack where the machining time does not continue despite the fact that the molds are exchanged, the machining with the fixed molds is moved to a place where the machining time is short, in order to uniformalize the machining time.

Next, (1) the materials are classified, (2) the data of tapped holes are picked up, and (3) processing is effected for preparing tapping data inclusive of the locus processing (G7) in the same manner as in the aforementioned step (F6) in FIGS. 20A to 20E. Then, as in the step (F7) in FIGS. 20A to 20E, (1) the cutting point is picked up, (2) rank of the remaining material is determined, (3) processing is executed for preparing cutting data inclusive of the substrate regeneration processing (G8), and NC data are prepared (G9).

FIGS. 23A and 23B are flow charts of NC group management and cell control according to the embodiment of the present invention, and schematically illustrates the operations of the numerically controlled processor 1 and the cell controllers 2-1 to 2-5 of FIG. 2. As in the NC group management (H3), (1) the NC data are managed, (2) proceeding degree of NC data is managed, and (3) operating conditions are monitored based upon the NC data (H1) and the external conditions (H2) obtained from the above-mentioned processes, and the cell controllers are controlled (H4).

In the NC data management mentioned in (1) above, when NC data are newly prepared, the NC data prepared, for example, one month ago are automatically deleted. That is, the old NC data are discarded. It is further allowable to write NC data at any time into an external medium such as a magnetic tape or a floppy disk which is then off-line connected to add NC data to the cell controllers. In the management of proceeding degree of NC data mentioned in (2) above, the proceeding degree of NC data is managed for each of the substrates to prevent machining in an overlapped manner and to clarify re-machining. In the monitoring of operation condition mentioned in (3), the data from the cell controllers are collected and stored, the operation conditions are displayed on the monitor terminal at a specified display cycle and when the data being monitored are not updated even after the passage of a predetermined period of time, an alarm is automatically raised.

When the numerically controlled processor 1 and the cell controllers 2-1 to 2-5, are connected together via a communication line 4, i.e., are on-line connected together, the cell controllers (1) convert the data among the machines, (2) exhibit a function for recognizing the piercing machine, and (3) collect NC machining conditions.

As for the data conversion among the machines mentioned in (1) above, the NC data are prepared in common and are converted to be adapted to the individual NC machines when they are to be transmitted to the individual NC machines. For instance, when the stations have dissimilar constitutions, conversion processing is effected such as dividing the steps. Furthermore, the command data are decomposed and are executed. As for the function for recognizing the piercing machine mentioned in (2), when the NC data are prepared exclusively for a given machine, an alarm is raised when other machines are called. When the machine is to be changed intentionally, a reply OK is sent back to the alarm display and the data are automatically changed to be adapted to the station of the machine called according to the condition 21. As for the collection of NC machining conditions mentioned in (3), the condition code is input by hand for the machinings other than the normal machinings, and the conditions of the NC machine are notified to the group management system inclusive of the numerically controlled processor 1.

When the next NC data are requested upon the completion of the machining steps in the NC machine controlled by the cell controller, the prepared NC data are for a given machine. When it is judged that the request is from a different machine, the station number is exchanged while the coordinate data, etc. remain unchanged. Then, the steps are divided when the number of stations are not in agreement and the NC codes for the NC machines are exchanged. Thereafter, the NC data are transmitted. Therefore, the machining is executed by the other NC machine based on the NC data without the need of again preparing the NC data.

The present invention is not limited to the above-mentioned embodiment only but can be modified in a variety of other ways. For instance, the invention can be adapted to a system equipped with NC machines of the kinds other than those shown in FIG. 2, and the processings executed by the numerically controlled processor 1 may be shared by the cell controllers. Furthermore, though the invention has dealt with the case of producing substrates of various sizes from a large substrate, the invention can be further adapted to machining parts other than substrates in a numerically controlled manner.

According to the present invention as described above, (1) all numerical control orders are classified into groups so that the due terms and the machining efficiencies are optimized. Therefore, the efficiency of the numerically controlled machining can be enhanced compared with that of the prior art which is based upon experiment and skill. Furthermore, (2) production turns are found based on the due terms, and the turns smaller than a reference value are regarded to be special express processes which are then classified into a group of machining methods giving importance to the degree of finish. The numerically controlled machining is then executed so as to be finished in a desired due term. The processes other than the special express processes are regarded to be normal processes for which judgement is rendered in regard to which one gives better machining efficiency between the method of minimizing the exchange of molds and the method of optimizing a drawing number. These machining methods are then classified into groups to enhance the machining efficiency.

Moreover, (3) the machining method giving importance to the degree of finish corresponds to the NC support 1 according to which the molds within a range of allowable sizes are uniformalized as the same mold, judgement is rendered in regard to whether there exists a mold that meets the follow-piercing conditions among the molds that are selected, and a new mold is selected only when there exists no mold that meets the follow-piercing conditions. Therefore, the absolute number of molds that are used is decreased, the number of times of exchanging the molds is decreased, and the machining efficiency is improved. Further, (4) a mold that is very frequently used is set to be a fixed mold, molds which are not used in the subsequent machinings are preferentially removed at the time of exchanging the molds, the molds are exchanged in the order of those having reduced numbers of drawings and those which have been removed many times. The molds which are exchanged many times are set to be fixed molds. Thus, the number of times of repetitively setting the same mold is decreased and the number of times of exchanging the mold is decreased. Moreover, (5) arrangement of the drawings is so changed that the arrangement rate of the drawings is larger than a specified value, and the average arrangement rate is improved and the substrate is efficiently utilized.

Even in the machining method of minimizing the exchange of molds (6), the molds within a range of allowable sizes are uniformalized into the same mold, the order for removing the molds is determined at the time of exchanging the molds based on the state where the molds are used, or the molds are assigned to be fixed molds, in order to decrease the number of times of exchanging the molds. Furthermore, (7) when there occurs an empty step after the machining in the first step is executed with the fixed molds including the highly frequently used molds, part of the machining in the first step is moved to a subsequent step to make the machining uniform, eliminating an occurrence where a substrate that is unfinished waits for being machined for extended periods of time. Therefore, the half-done period of when the rack is used is shortened, the total number of racks that are used is decreased, and reduced space is required for the preservation.

In the method of minimizing a drawing number (8), furthermore, the drawing numbers that use very frequently used molds are so rearranged that they can be preferentially machined. Accordingly, the number of times of exchanging the mold is decreased, and the time until the machining is finished is shortened in loop machining.

Further, (9) in the numerically controlled machining system which includes the numerically controlled processor 100, controllers 101 and numerically controlled machines 102, the numerically controlled processor 100 effects the grouping based on the numerically controlled orders to prepare numerical control machining data which are then distributed to the controllers 101. Thus, the numerically controlled machining is automatically executed in an optimum manner by the numerically controlled machines 102. In the numerically controlled processor 100 or in the controllers 101, furthermore, the numerical control machining data are converted depending upon the station number that corresponds to the numerically controlled machine number. Therefore, even when the machining is executed by another numerically controlled machine due to the occurrence of trouble in the numerically controlled machine, there is no need of again preparing the numerical control machining data, and the efficiency in the numerical control machining can be improved.

Moreover, (10) the numerically controlled processor 1, 100 is constituted by the mechanism managing unit 1-1, NC support group managing unit 1-2 and subsystem control unit 1-3, wherein the mechanism managing unit 1-2 manages the numerically controlled orders, the subsystem control unit 1-3 manages mold master and machining master data, the NC support group managing unit 1-2 effects the grouping based on the numerically controlled orders, and the subsystem control unit 1-3 prepares numerical control machining data by making reference to the mold master and machining master data. Group management can be efficiently done for a plurality of numerically controlled machines.

We claim:

1. A numerically controlled machining method for machining parts, the method comprising the steps of: finding production times for machining parts for all of numerical control orders that are input in a numerically controlled machine; comparing said production times with a reference value to classify the numerical control orders of which the production times are smaller than the reference value to be a group of special express processes and to classify the numerical control orders of which the production times are larger than the reference value to be a group of normal processes; classifying the processes to be any one of a group of machining methods giving importance to the degree of finish of machining of a part for shortening the finishing period, machining methods for minimizing the number of times of exchanging molds to be used for machining, or machining methods for optimizing a drawing number by bringing the arrangement process into consideration, whichever gives a higher machining efficiency based upon the machining data in the numerically controlled machine and preparing numerical control machining data for each of the groups.

2. A numerically controlled machining method comprising the steps of: finding production times for machining parts for all of numerical control orders that are input in a numerically controlled machine; comparing said production times with a reference value to classify the numerical control orders of which the production times are smaller than the reference value to be a group of special express processes and to classify other numerical control orders to be a group of normal processes, regarding said group of special express processings to be a group of machining methods giving importance to the degree of finish of machining of a part; classifying said group of normal processes to be either one of a group of machining methods for minimizing the number of times of exchanging molds to be used for machining, or a group of machining methods of optimizing a drawing number based upon the machining data of the group; and preparing numerical control machining data for each of the groups.

3. A numerically controlled machining method according to claim 1, wherein said machining method giving importance to the degree of finish includes the steps of: employing a uniform mold to be used for machining within a range of allowable sizes based upon the machining data; selecting a mold that meets follow-piercing conditions out of the selected molds; and preparing numerical control machining data for selecting a new mold only when that mold does not meet said follow-piercing conditions.

4. A numerically controlled machining method according to claim 1, wherein said machining method giving importance to the degree of finish includes the steps of: picking up a mold that is very frequently used as a fixed mold based upon the machining data; exchanging the molds to be used for machining in the order of a mold that will not be used in the subsequent machining, a mold which is used for the machining but has a decreased number of drawings to be used, and a mold that is frequently removed; and preparing numerical control machining data for regarding the mold, which has been exchanged the number of times which exceeded an allowable value, as a fixed mold.

5. A numerically controlled machining method according to claim 1, wherein said machining method giving importance to the degree of finish includes a step of: preparing numerical control machining data, based upon the machining data, for executing the arrangement process in the order of decreasing outer sizes of the drawings that are to be arranged in a manner that the rate of arrangement is greater than a reference value.

6. A numerically controlled machining method according to claim 1, wherein said machining method for minimizing the number of times of exchanging the molds includes the steps of: employing a uniform mold to be used for machining within a range of allowable sizes based upon the machining data; selecting a mold that meets follow-piercing conditions, out of the selected molds; and preparing numerical control machining data for selecting a new mold only when that mold did not meet said follow-piercing conditions.

7. A numerically controlled machining method according to claim 1, wherein said machining method for minimizing the number of times of exchanging the molds includes the steps of: executing the machining in a first step using a fixed mold, inclusive of a mold to be used for machining that is very frequently used, based upon the machining data and when no machining step occurs after the first step, moving part of the machining in said first step to the head of the next consecutive step, and executing the machining in said first step using the fixed mold and other mold and when an empty step occurs after said first step; moving part of the machining in said first step to a step having the least machining time after said first step but before a final step; and preparing numerical control machining data.

8. A numerically controlled machining method according to claim 1, wherein said machining method of optimizing a drawing number includes the steps of: finding the frequencies for using the molds to be used for machining based upon the machining data; rearranging the molds such that the drawing numbers that use molds that are very frequently used are preferentially machined; and preparing numerical control machining data.

9. A numerically controlled machining system comprising:
a plurality of numerically controlled machines arranged in accordance with the machining steps to be executed on parts;
a plurality of controllers for respectively controlling said numerically controlled machines; and
a numerically controlled processor which finds production times for all of numerical control orders that are input in the system, compares said production times with a reference value to classify the numerical control orders of which the production times are smaller than the reference value as a group of special express processes and to classify the numerical control orders of which the production times are larger than the reference value to be a group of normal processes, classifies the processes to be any one of a group of machining methods giving importance to the degree of finish for shortening the finishing period, machining methods for minimizing the number of times of exchanging the molds or machining methods of optimizing a drawing number by bringing the arrangement processing into consideration, whichever gives a higher machining efficiency based upon the machining data, prepares numerical control machining data for each of the groups, and distributes said numerical control machining data to said controllers.

10. A numerically controlled machining system according to claim 9, wherein said numerically controlled processor includes a mechanism managing unit for managing the numerical control orders that are input, the degree of machining that is done and the load condition of the numerically controlled machines, an NC support group managing unit for distributing to said controller the numerical control machining data by dividing the numerical control machining data into a group of the machining method for special express processes giving importance to the degree of finish, a group of machining methods for normal processes for minimizing the number of times of exchanging the molds, and a group of machining methods of optimizing a drawing number, and a subsystem control unit for managing the mold master and machining master data.

11. A numerically controlled machining system according to claim 9, wherein said machining system giving importance to the degree of finish a uniform mold to be used for machining the parts within a range of allowable sizes based upon the machining data; selecting a mold to be used for machining that meets follow-piercing conditions out of the selected molds; and means for preparing numerical control machining data for selecting a new mold only when that mold does not meet said follow-piercing conditions.

12. A numerically controlled machining system according to claim 9, wherein said machining system giving importance to the degree of finish includes means for picking up a mold that is very frequently used as a fixed mold based upon the machining data; exchanging the molds in the order of a mold to be used for machining parts that will not be used in the subsequent machining, a mold which is used for the machining but has a decreased number of drawings to be used, and a mold that is frequently removed; and means for preparing numerical control machining data for regarding the mold which has been exchanged the number of times which exceeded an allowable value to be a fixed mold.

13. A numerically controlled machining system according to claim 9, wherein said machining system giving importance to the degree of finish includes means for preparing numerical control machining data based upon the machining data, for executing the arrangement processes in the order of decreasing outer sizes of the drawings that are to be arranged in a manner that the rate of arrangement is greater than a reference value.

14. A numerically controlled machining system according to claim 9, wherein said machining system for minimizing the number of times of exchanging molds to be used for machining includes a uniform mold within a range of allowable sizes based upon the machining data; means for selecting a mold that meets follow-piercing conditions out of the selected molds; and means for preparing numerical control machining data for selecting a new mold only when that mold does not meet said follow-piercing conditions.

15. A numerically controlled machining system according to claim 9, wherein said machining system for minimizing the number of times of exchanging molds to be used for machining includes means for executing the machining in a first step using a fixed mold, inclusive of a mold that is very frequently used, based upon the machining data and when no machining step occurs after the first step, moving part of the machining in said first step to the head of the next consecutive step, and executing the machining in said first step using the fixed mold and another mold and when an empty step occurs after said first step; means for moving part of the machining in said first step to a step having the least machining time after said first step but before a final machining step; and means for preparing numerical control machining data.

16. A numerically controlled machining system according to claim 9, wherein said machining system for optimizing a drawing number includes means for finding the frequencies for using the molds based upon the machining data; rearranging the molds such that the drawing numbers that use molds that are very frequently used are preferentially machined; and means for preparing numerical control machining data.

* * * * *